(12) United States Patent
Olson et al.

(10) Patent No.: US 8,556,127 B2
(45) Date of Patent: Oct. 15, 2013

(54) ADDITIVE DISPENSING SYSTEM FOR A REFRIGERATOR

(75) Inventors: Judd Dylan Olson, Minnetonka, MN (US); John Paul Boros, Maple Lake, MN (US); David James Emmons, Plymouth, MN (US)

(73) Assignee: PUR Water Purification Products, Inc., El Paso, TX (US)

( * ) Notice: Subject to any disclaimer, the term of this patent is extended or adjusted under 35 U.S.C. 154(b) by 1923 days.

(21) Appl. No.: 11/159,423

(22) Filed: Jun. 22, 2005

(65) Prior Publication Data
US 2006/0006107 A1    Jan. 12, 2006

Related U.S. Application Data

(63) Continuation-in-part of application No. 10/852,708, filed on May 24, 2004, now abandoned.

(51) Int. Cl.
*B65D 88/54* (2006.01)

(52) U.S. Cl.
USPC .............................. 222/162; 222/325; 62/389

(58) Field of Classification Search
USPC ............... 62/389; 210/198.1; 222/146.6, 160, 222/162, 325, 326
See application file for complete search history.

(56) References Cited

U.S. PATENT DOCUMENTS

| | | | |
|---|---|---|---|
| 1,631,932 A | 6/1927 | Griffin | |
| 1,660,174 A | 2/1928 | Parry et al. | |
| 2,328,110 A | 8/1943 | Thompson et al. | |
| 2,631,521 A | 11/1949 | Atkins, Jr. | |
| 2,502,603 A | 4/1950 | Tanner | |
| 2,502,610 A | 4/1950 | Wegman | |
| 2,705,091 A | 12/1952 | Marchand | |
| 2,772,817 A * | 12/1956 | Jauch | 222/207 |
| 3,171,571 A * | 3/1965 | Daniels | 222/94 |
| 3,255,691 A | 6/1966 | Schwartz et al. | |
| 3,341,083 A | 9/1967 | Stewart | |
| 3,375,913 A | 4/1968 | Norris, Jr. | |
| 3,519,134 A | 7/1970 | Hassinger | |
| 3,568,887 A | 3/1971 | Jacobs et al. | |
| 3,784,008 A | 1/1974 | Troglione | |

(Continued)

FOREIGN PATENT DOCUMENTS

| CS | 281333 | 8/1996 |
|---|---|---|
| DE | 20107676 | 8/2001 |

(Continued)

OTHER PUBLICATIONS

USPTO Non-Final Rejection mailed Jun. 24, 2009 in reference to co-pending U.S. Appl. No. 10/852,708, filed May 24, 2004.

(Continued)

*Primary Examiner* — Terry Cecil
(74) *Attorney, Agent, or Firm* — Dinsmore & Shohl LLP

(57) ABSTRACT

An additive dispensing system for a refrigerator that includes a reservoir configured to contain an additive and an additive outlet in fluid communication with the reservoir. The additive dispensing system is configured to be connected to a refrigerator and is operable to selectively dispense an amount of additive to water dispensed from the refrigerator. The additive dispensing system may be connected to a water filtration system of the refrigerator such that the additive dispensing system may dispense the amount of additive into filtered water dispensed from the refrigerator.

14 Claims, 20 Drawing Sheets

(56) References Cited

U.S. PATENT DOCUMENTS

| | | | |
|---|---|---|---|
| 3,814,548 A | 6/1974 | Rupp | |
| 3,883,429 A | 5/1975 | Hanford | |
| 4,324,494 A | 4/1982 | Pryor | |
| 4,414,996 A | 11/1983 | Klepa | |
| 4,465,488 A | 8/1984 | Richmond et al. | |
| 4,469,250 A * | 9/1984 | Evezich | 222/83.5 |
| 4,513,713 A | 4/1985 | Koumura et al. | |
| 4,565,302 A | 1/1986 | Pfeiffer et al. | |
| 4,582,223 A | 4/1986 | Kobe | |
| 4,674,657 A | 6/1987 | Daniels | |
| 4,786,500 A | 11/1988 | Wong | |
| 4,817,822 A | 4/1989 | Rand et al. | |
| 4,860,923 A | 8/1989 | Kirschner et al. | |
| 5,036,462 A | 7/1991 | Kaufman et al. | |
| 5,045,195 A | 9/1991 | Spangrud et al. | |
| 5,076,425 A | 12/1991 | Plone | |
| 5,078,874 A | 1/1992 | Sullivan | |
| 5,096,721 A | 3/1992 | Levy | |
| 5,106,500 A | 4/1992 | Hembree et al. | |
| 5,114,045 A | 5/1992 | Herpe | |
| 5,114,048 A | 5/1992 | Minke | |
| RE33,969 E | 6/1992 | Richter | |
| 5,211,973 A | 5/1993 | Nohren, Jr. | |
| 5,215,659 A | 6/1993 | Ando | |
| 5,268,093 A | 12/1993 | Hembree et al. | |
| 5,325,996 A | 7/1994 | Bannigan | |
| 5,342,518 A | 8/1994 | Posner et al. | |
| 5,353,963 A | 10/1994 | Gorski et al. | |
| 5,370,041 A | 12/1994 | Lowe | |
| D358,868 S | 5/1995 | Hembree et al. | |
| 5,427,682 A | 6/1995 | Vogel et al. | |
| 5,431,313 A | 7/1995 | Renault | |
| 5,433,343 A | 7/1995 | Meshberg | |
| 5,443,739 A | 8/1995 | Vogel et al. | |
| D362,583 S | 9/1995 | Weber et al. | |
| 5,518,743 A | 5/1996 | Pergola et al. | |
| 5,525,214 A | 6/1996 | Hembree | |
| 5,527,451 A | 6/1996 | Hembree et al. | |
| 5,536,394 A | 7/1996 | Lund et al. | |
| 5,587,089 A | 12/1996 | Vogel et al. | |
| D377,515 S | 1/1997 | Hembree et al. | |
| 5,597,487 A | 1/1997 | Vogel et al. | |
| D386,041 S | 11/1997 | Tanner et al. | |
| 5,707,518 A * | 1/1998 | Coates et al. | 210/232 |
| 5,709,694 A | 1/1998 | Greenberg et al. | |
| 5,826,755 A | 10/1998 | Burd | |
| D406,003 S | 2/1999 | Tanner et al. | |
| 5,897,770 A | 4/1999 | Hatch et al. | |
| 5,918,768 A | 7/1999 | Ford | |
| 5,922,378 A * | 7/1999 | Kagan et al. | 426/132 |
| 5,928,504 A | 7/1999 | Hembre et al. | |
| 5,931,343 A | 8/1999 | Topar et al. | |
| 5,941,380 A | 8/1999 | Rothman | |
| 5,980,959 A | 11/1999 | Frutin | |
| 5,992,685 A * | 11/1999 | Credle, Jr. | 222/1 |
| 5,997,734 A | 12/1999 | Koski et al. | |
| 6,024,012 A | 2/2000 | Luzenberg, Jr. | |
| 6,097,685 A | 8/2000 | Yamaguchi et al. | |
| 6,098,795 A | 8/2000 | Mollstam et al. | |
| 6,099,735 A | 8/2000 | Kelada | |
| 6,103,114 A | 8/2000 | Tanner et al. | |
| 6,105,638 A | 8/2000 | Edwards et al. | |
| D438,592 S | 3/2001 | Gaston et al. | |
| 6,202,541 B1 | 3/2001 | Cai | |
| D440,110 S | 4/2001 | Tanner et al. | |
| 6,221,416 B1 | 4/2001 | Nohren, Jr. | |
| 6,224,751 B1 | 5/2001 | Hofmann et al. | |
| 6,244,474 B1 | 6/2001 | Loeffler | |
| 6,290,848 B1 | 9/2001 | Tanner et al. | |
| 6,372,270 B1 | 4/2002 | Denny | |
| 6,394,312 B1 * | 5/2002 | Endou | 222/129.1 |
| 6,405,900 B1 | 6/2002 | Kown | |
| 6,409,046 B1 | 6/2002 | Peckels | |
| 6,409,099 B1 | 6/2002 | Goodwin et al. | |
| 6,419,118 B1 | 7/2002 | Rees et al. | |
| 6,423,224 B1 | 7/2002 | Tanner et al. | |
| 6,428,689 B1 | 8/2002 | Kameyama et al. | |
| 6,461,498 B2 | 10/2002 | Tseng | |
| 6,478,192 B2 | 11/2002 | Heyes | |
| 6,482,451 B1 | 11/2002 | Baron | |
| 6,527,109 B2 | 3/2003 | Schoo et al. | |
| 6,530,495 B1 | 3/2003 | Joseph | |
| 6,540,070 B1 | 4/2003 | Conwell | |
| 6,565,749 B1 | 5/2003 | Hou et al. | |
| 6,602,410 B1 | 8/2003 | Tanner et al. | |
| 6,651,824 B2 | 11/2003 | Miller | |
| 6,652,893 B2 | 11/2003 | Berson | |
| 6,672,097 B1 * | 1/2004 | Ashley | 62/340 |
| 6,672,817 B2 | 1/2004 | Denny | |
| 6,759,072 B1 | 7/2004 | Gutwein et al. | |
| 6,770,323 B2 | 8/2004 | Genzer et al. | |
| 6,845,788 B2 | 1/2005 | Extrand | |
| 6,852,390 B2 | 2/2005 | Extrand | |
| 2002/0005377 A1 | 1/2002 | Tanner et al. | |
| 2002/0125187 A1 | 9/2002 | Tanner et al. | |
| 2002/0139797 A1 | 10/2002 | Danze | |
| 2003/0012849 A1 | 1/2003 | Berson | |
| 2003/0049352 A1 | 3/2003 | Mehansho et al. | |
| 2003/0203075 A1 | 10/2003 | Taylor | |
| 2003/0234212 A1 | 12/2003 | Ito et al. | |
| 2004/0055948 A1 | 3/2004 | Blum et al. | |
| 2004/0084096 A1 | 5/2004 | Whaley | |
| 2005/0133420 A1 | 6/2005 | Rinker et al. | |
| 2005/0133427 A1 | 6/2005 | Rinker et al. | |
| 2005/0145548 A1 | 7/2005 | Rhoades | |
| 2006/0016347 A1 | 1/2006 | Girard et al. | |

FOREIGN PATENT DOCUMENTS

| | | |
|---|---|---|
| EP | 0 077 208 A1 | 4/1983 |
| EP | 0 077 208 B1 | 6/1985 |
| EP | 0 224 335 A2 | 3/1987 |
| EP | 0 224 335 A3 | 3/1987 |
| EP | 0 224 335 B1 | 3/1987 |
| EP | 0 301 672 A2 | 1/1989 |
| EP | 0 301 672 A3 | 1/1989 |
| EP | 928565 | 7/1999 |
| EP | 1 161 933 A2 | 12/2001 |
| EP | 1 241 110 A1 | 9/2002 |
| EP | 1 310 900 A2 | 5/2003 |
| EP | 1 310 900 A3 | 6/2003 |
| GB | 1 286 628 | 8/1972 |
| GB | 2 299 953 A | 10/1996 |
| JP | 01075094 | 3/1989 |
| JP | 09085227 | 3/1997 |
| JP | 2002192170 | 7/2002 |
| JP | 2003275752 | 9/2003 |
| KR | 2003020052 | 3/2003 |
| NL | 1019661 | 7/2003 |
| RU | 2198724 | 2/2003 |
| RU | 2206397 | 6/2003 |
| WO | WO 91/15281 | 10/1991 |
| WO | WO 91/19555 | 12/1991 |
| WO | WO 94/06547 | 3/1994 |
| WO | WO 96/01675 A1 | 1/1996 |
| WO | WO 98/15187 | 4/1998 |
| WO | WO 98/46534 | 10/1998 |
| WO | WO 99/26883 | 6/1999 |
| WO | WO 99/35091 | 7/1999 |
| WO | WO 99/35092 | 7/1999 |
| WO | WO 99/38395 A1 | 8/1999 |
| WO | WO 00/09448 A1 | 2/2000 |
| WO | 0039240 | 7/2000 |
| WO | WO 00/38845 | 7/2000 |
| WO | WO 02/40414 | 5/2002 |
| WO | WO 02/096225 | 12/2002 |
| WO | WO 03/022401 A2 | 3/2003 |
| WO | WO 03/022401 A3 | 3/2003 |
| WO | WO 03/031351 | 4/2003 |
| WO | WO 03/072510 A1 | 9/2003 |
| WO | WO 03/073029 A1 | 9/2003 |
| WO | WO 03/090565 | 11/2003 |
| WO | WO 03/097478 A1 | 11/2003 |

(56) References Cited

FOREIGN PATENT DOCUMENTS

| WO | WO 2004/013047 A2 | 2/2004 |
|---|---|---|
| WO | WO 2004/013047 A3 | 2/2004 |
| WO | WO 2004/026769 A1 | 4/2004 |

OTHER PUBLICATIONS

USPTO Final Rejection mailed Sep. 18, 2008 in reference to co-pending U.S. Appl. No. 10/852,708, filed May 24, 2004.
USPTO Restriction Requirement mailed May 7, 2008 in reference to co-pending U.S. Appl. No. 10/852,708, filed May 24, 2004.
USPTO Non-Final Rejection mailed Oct. 4, 2007 in reference to co-pending U.S. Appl. No. 10/852,708, filed May 24, 2004.
USPTO Advisory Action mailed Jul. 9, 2007 in reference to co-pending U.S. Appl. No. 10/852,708, filed May 24, 2004.
USPTO Final Rejection mailed Apr. 30, 2007 in reference to co-pending U.S. Appl. No. 10/852,708, filed May 24, 2004.
USPTO Non-Final Rejection mailed Nov. 21, 2006 in reference to co-pending U.S. Appl. No. 10/852,708, filed May 24, 2004.
USPTO Final Rejection mailed Aug. 27, 2009 in reference to co-pending U.S. Appl. No. 11/158,937, filed Jun. 22, 2005.
USPTO Non-Final Rejection mailed Dec. 17, 2008 in reference to co-pending U.S. Appl. No. 11/158,937, filed Jun. 22, 2005.
USPTO Restriction Requirement mailed Aug. 19, 2008 in reference to co-pending U.S. Appl. No. 11/158,937, filed Jun. 22, 2005.
USPTO Final Rejection mailed Aug. 28, 2009 in reference to co-pending U.S. Appl. No. 11/347,820, filed Feb. 3, 2006.
USPTO Non-Final Rejection mailed Dec. 19, 2008 in reference to co-pending U.S. Appl. No. 11/347,820, filed Feb. 3, 2006.
USPTO Final Rejection mailed Dec. 17, 2008 in reference to co-pending U.S. Appl. No. 10/852,708, filed May 24, 2004.
USPTO Non-Final Rejection mailed Dec. 17, 2009 in reference to co-pending U.S. Appl. No. 11/158,937, filed Jun. 22, 2005.
USPTO Final Rejection mailed Jan. 20, 2011 in reference to co-pending U.S. Appl. No. 10/852,708, filed May 24, 2004.
USPTO Non Final Rejection mailed Jun. 21, 2011 in reference to co-pending U.S. Appl. No. 10/852,708, filed May 24, 2004.
USPTO Non Final Rejection mailed May 4, 2010 in reference to co-pending U.S. Appl. No. 10/852,708, filed May 24, 2004.
USPTO Elections/Restriction mailed Oct. 13, 2010 in reference to co-pending U.S. Appl. No. 10/852,708, filed May 24, 2004.
USPTO Final Rejection mailed May 6, 2010 in reference to co-pending U.S. Appl. No. 11/158,937, filed Jun. 22, 2005.
USPTO Final Rejection mailed Nov. 4, 2011 in reference to co-pending U.S. Appl. No. 10/852,708, filed May 24, 2004.

\* cited by examiner

ADDITIVE DISPENSING SYSTEM FOR A REFRIGERATOR

CROSS REFERENCE

This application is a continuation-in-part of U.S. application Ser. No. 10/852,708, filed May 24, 2004, now abandoned, and is herein incorporated by reference.

FIELD OF THE INVENTION

The present invention relates generally to an additive dispensing system. More particularly, the present invention relates to an additive dispensing system configured to be connected to a refrigerator, even more specifically connected to a water system of a refrigerator.

BACKGROUND OF THE INVENTION

Water treatment devices for home and other uses are well known in the art. Such devices are typically incorporated in a water system either in-line or at a terminal end. An example of the former would be an under-the-counter device which filters water prior to reaching a faucet outlet. There are two common types of terminal end devices—countertop and faucet mounted. Water treatment devices can treat water by the use of mechanical filtration or chemical treatment. Most water-filtration systems use a filter-cartridge containing either activated carbon or a combination of activated carbon and an ion-exchange resin. The activated carbon serves to filter out particulates and other impurities, while eliminating most of the chlorine present in the water. The ion-exchange resin removes positive ions such as calcium, thereby softening the water. A negative side-effect of the above-mentioned systems is that various other healthy minerals can be removed by the ion-exchange resin. An alternative method of water purification is reverse osmosis, but products using this technology are not widely utilized by household consumers due to their high costs.

In recent years, consumption of water by people has risen due to better health education and other information available to the public. However, public perception of the poor quality and taste of regular tap water has led to the development and sale of a number of products addressing these problems. Various bottled waters are available to consumers. Some of these bottled waters have additional additives which the consumer may find beneficial. Such additives include nutrients, vitamins, minerals and flavorings. These bottled waters are sometimes called fitness waters, vitamin waters or enhanced waters. However, the cost and inconvenience of obtaining enhanced bottled water products on a regular basis may discourage consumers from consuming additional water. Accordingly, a more convenient and cost effective approach for providing enhanced water to the public is needed.

SUMMARY OF THE INVENTION

The present invention is directed to a cartridge for dispensing an additive to water and, more particularly disposable cartridge connectable to a water filtration system for dispensing a consumable additive, which enables a user to selectively dispense an amount of an additive to filtered water.

One embodiment of the present invention is an additive dispensing system for a refrigerator including a reservoir configured to contain an additive and an additive outlet in fluid communication with the reservoir. The additive dispensing system is configured for connection substantially near a refrigerator. The additive dispensing system is operable to selectively dispense an amount of additive.

Another embodiment of the present invention is an additive dispensing cartridge for a refrigerator including a housing, a bladder disposed within the housing, a pump connected to the housing and in fluid communication with the bladder, and an additive outlet in fluid communication with the pump. The bladder is configured to contain a consumable additive. The cartridge is configured for connection to a refrigerator and to selectively dispense an amount of additive with filtered water dispensed from the refrigerator.

Yet another embodiment of the present invention is a water filtration system for a refrigerator. The water filtration system includes a water inlet connectable to an unfiltered water source, a water filter in fluid communication with said water inlet, a first water outlet in fluid communication with the water filter operable to dispense filtered water from the refrigerator, and an additive dispensing system. The additive dispensing system is operable to selectively dispense an amount of additive to water filtered by the water filter.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

Figure 1:
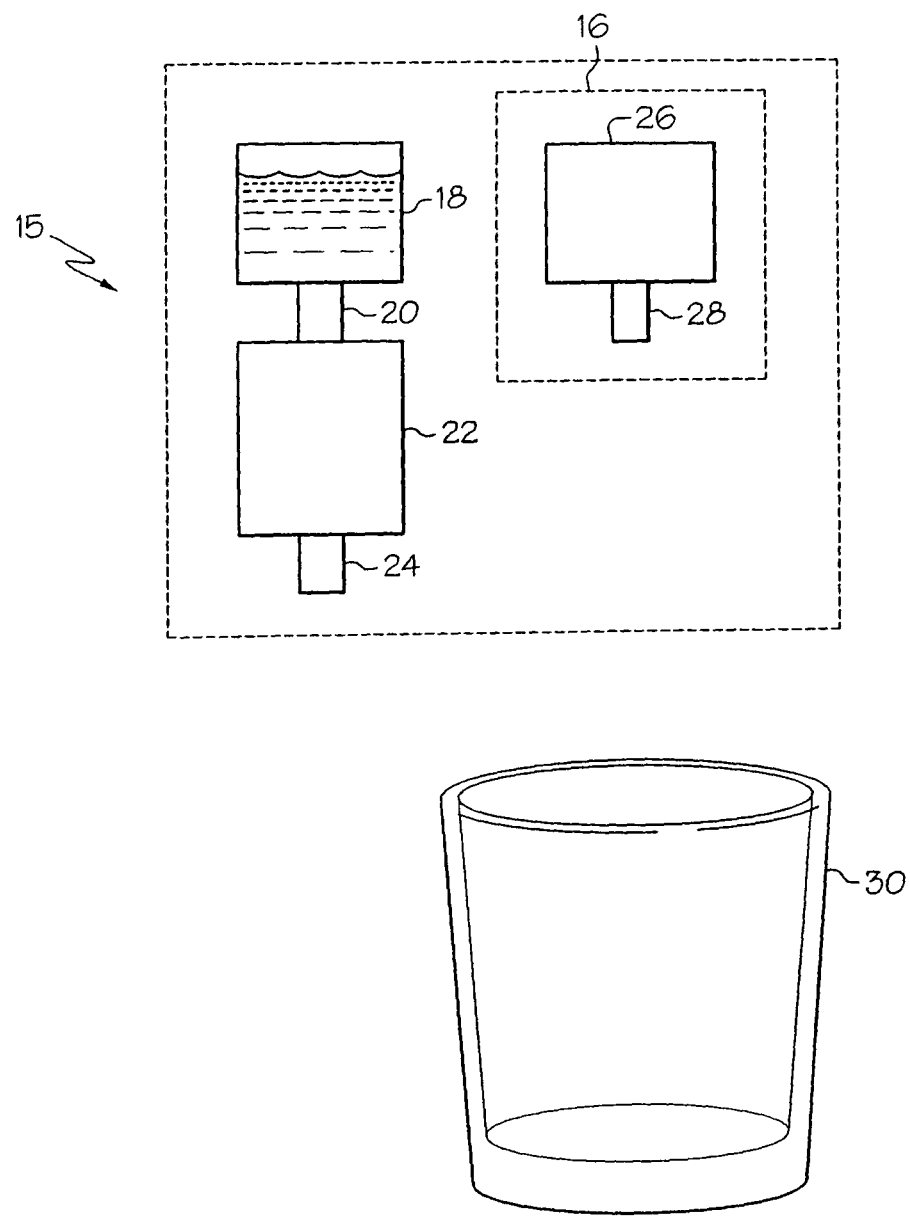
FIG. 1 is a schematic illustration of an exemplary water filtration system according to an embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

Reference will now be made in detail to various embodiments of the invention, examples of which are illustrated in the accompanying drawings, wherein like numerals indicate similar elements throughout the views.

FIG. 1 illustrates an exemplary water filtration system 15 according to one embodiment of the present invention. The water filtration system 15 comprises a water inlet 20 connectable to an unfiltered water source 18. The water inlet 20 is in fluid communication with the water filter 22. The water filter 22 is operable to filter one or more contaminants or particulates from the unfiltered water. An outlet 24 is in communication with the water filter 22 and is operable to dispense filtered water. The water filtration system 15 further comprises an additive dispensing system 16. The additive dispensing system 16 comprises a reservoir 26 for containing an additive and an additive outlet 28. The additive dispensing system 16 is operable to selectively dispense an amount of additive to the filtered water. In one exemplary embodiment, filtered water dispensed from the outlet 24 is dispensed into a glass or other container 30 and an additive is dispensed into the filtered water in the container 30 through the additive outlet 28.

The water inlet 20 is connectable to any unfiltered water source. Exemplary unfiltered water sources comprise garden hose, water line, water faucet mounts, water reservoirs, water pitchers and dispensers and the like.

The water filter 22 may comprise any water filter technology known to one skilled in the art. Such water filter media may include, activated carbon or the like for removal of organics from the water; halogenated resin fibers and/or halogenated resin beads or other media, for destroying bacteria and viruses within the water; ion exchange resins (such as halogen based action exchange resin for the removal of sodium) for removal of ionic materials from the water; and removing bacteria by microfiltration. One exemplary water filter that may be employed in the present invention is disclosed by Hou et al., U.S. Pat. No. 6,565,749.

In one embodiment, the additive in the reservoir 26 is in a liquid form. In another embodiment, the additive in the reservoir 26 is in the form of a dry powder. The additive comprises one or more additives selected from the group consisting of flavorings, vitamins, minerals and nutrients. Additive minerals include minerals selected from the group consisting of ions calcium, silicate, chloride, magnesium, potassium, sodium, selenium, zinc, iron, manganese and mixtures thereof. Vitamin additives comprise vitamins selected from the group consisting of vitamin B12, vitamin C and mixtures thereof. In other embodiments, homeopathic remedies and herbal remedies, as well as flavorings, may be included as additive in the reservoir 22.

In one embodiment, the additive comprises hydroalcoholic extracts of natural oils. Other additives may comprise elixirs, spirits or essences and tinctures. An elixir is a clear, sweetened hydroalcoholic liquid intended for oral use. The alcohol content ranges from about 5% to about 50% by volume. Spirits or essences are alcoholic or hydroalcoholic solutions prepared from vegetable or chemical substances. The concentration of the solute varies up to 50%. The hydroalcoholic extracts of natural oils range from about 0.025 to about 0.5% by volume of the filtered water to deliver a hint of flavor to the filtered water. In another embodiment, the additives may comprise one or more coloring agents, such as food coloring, to add a color to the filter water. Exemplary flavors comprise lemon, lime, berry, citrus, orange, strawberry and mixtures of the same.

The reservoir 26 may be constructed from any material known to one skilled in the art that would not contaminate or have its material properties effected by the additive. Exemplary materials of construction for the reservoir 26 include polymers, for example, polypropylene (PP), polyethylene terephthalate (PET), high density polyethylene (HDPE), low density polyethylene (LDPE), polyvinyl chloride (PVC), polystyrene, nylon, polyester, and the like. Other exemplary materials of construction include aluminum foil. In one embodiment, the reservoir 26 comprises multiple layers of the material. In another embodiment, any flexible material with suitable barrier properties may be utilized.

While the schematic illustration in FIG. 1 depicts the outlet 24 and additive outlet 28 separately dispensing water and additive, respectively, to the container 30, it is equally within the illustrated systems and invention that the additive outlet 28 may be in fluid communication with the outlet 24. For example, the water filtration system may further comprise an outlet mixer configured to combine the outlet 24 and the additive outlet 28 into one outlet stream, prior to dispensing the resulting mixture to the container 30.

Figure 2:
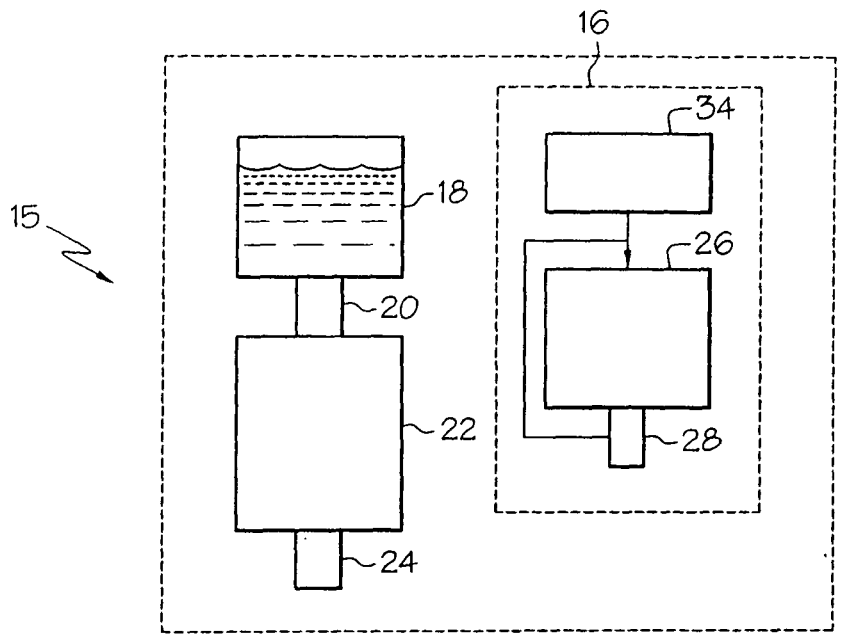
FIG. 2 is a schematic illustration of an exemplary water filtration system according to an embodiment of the present invention.

In one exemplary embodiment as illustrated in FIG. 2, the water filtration system 15 further comprises a controller 34 in communication with the additive outlet 28. The controller 34 is configured to regulate the amount of additive dispensed through the additive outlet 28. The controller 34 may comprise a limiting valve 36 (see FIG. 5). The limiting valve 36 is operable to limit or regulate the amount of additive, if any, that is dispersed through the additive outlet 28. In another embodiment, the controller 34 may comprise a microprocessor in communication with a limiting valve 36. In one exemplary embodiment, the controller 34 may comprise a dial or other input device to allow the user to select the amount of additive to be dispensed into the filtered water.

Figure 3:
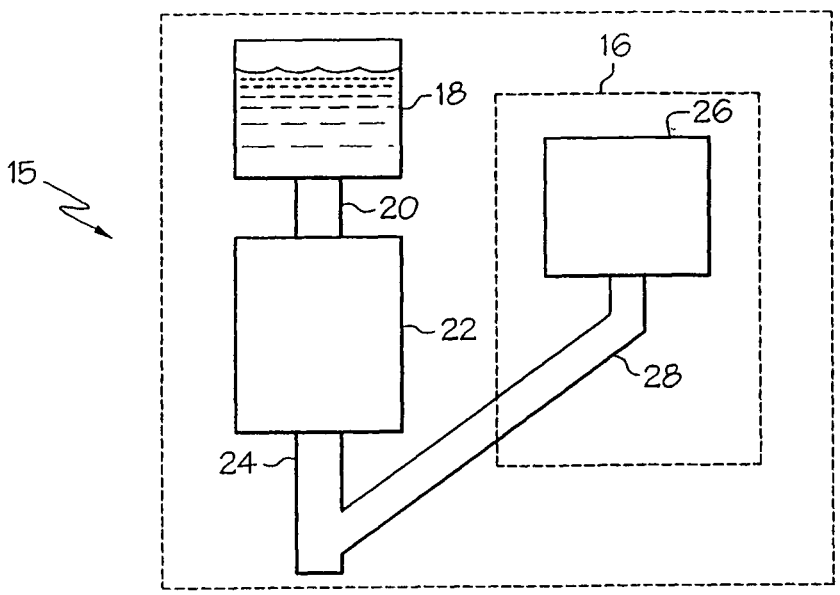
FIG. 3 is a schematic illustration of an exemplary water filtration system according to an embodiment of the present invention.
Figure 10:
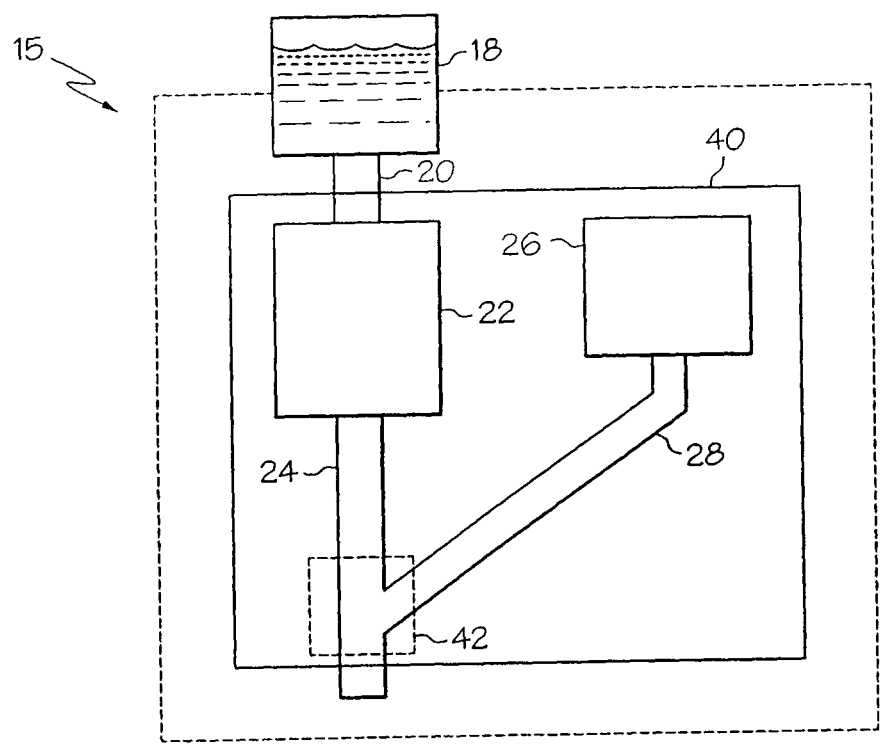
FIG. 10 is a schematic illustration of an exemplary water filtration system according to an embodiment of the present invention.

In yet another exemplary embodiment, illustrated in FIG. 3, the water filtration system 15 comprises a water inlet 20 in communication with the unfiltered water source 18, such as a faucet. A water filter 22 is in communication with the water inlet 20 and filtered water from the water filter 22 is dispensed at the outlet 24. The additive dispensing system 16 comprises a reservoir 26 for containing an additive and an additive outlet 28. In this embodiment, the additive outlet 28 is in fluid communication with the outlet 24. In one exemplary embodiment, as illustrated in FIG. 10, the additive outlet 28 and the outlet 24 connect together inside a housing 40 of the water filtration system 15 at an outlet mixer 42, such that the exterior of the water filtration system 15 only has one outlet stream.

In one embodiment of the present invention, the additive outlet 28 and outlet 24 are configured and placed in communication in such a way as to create a venturi suction effect when filtered water in the outlet 24 moves past the additive outlet 28. This venturi suction effect generates a vacuum that pulls the additive in the additive outlet 28 into the filtered water flowing through the outlet 24.

Figure 4:
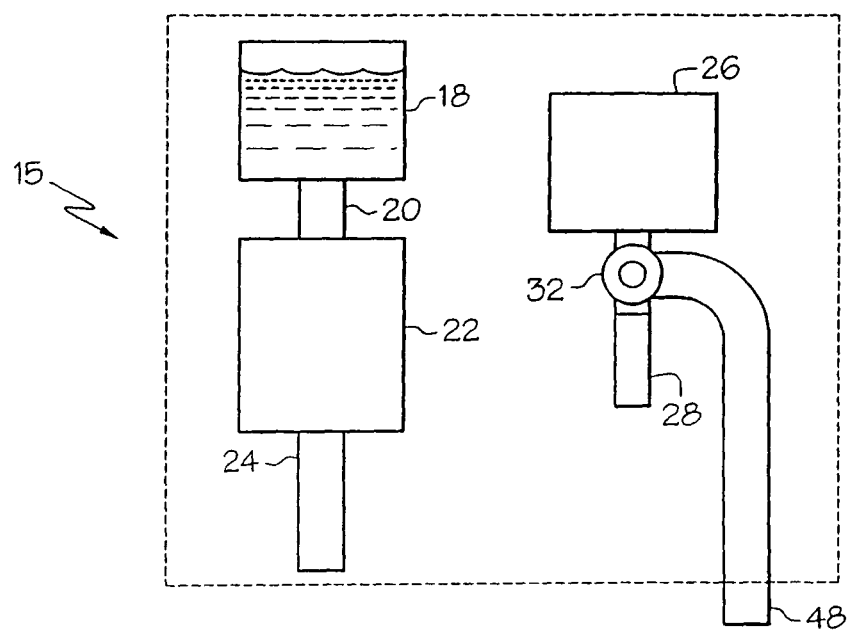
FIG. 4 is a schematic illustration of an exemplary water filtration system according to an embodiment of the present invention.

In another exemplary embodiment of the present invention, illustrated in FIG. 4, the additive dispensing system 16 further comprises a pump 32. The pump 32 is in communication with the reservoir 26 and the additive outlet 28. The pump 32 is configured to transport additive from the reservoir 26 to the additive outlet 28 to be added to filtered water. In one embodiment, the pump 32 comprises a diaphragm pump. As one skilled in the art. will appreciate any pump known to one skilled in the art may be utilized to transfer the additive to the additive outlet 28. Exemplary pumps include piston pumps, peristaltic pumps, and bellows-type pumps. In another exemplary embodiment, the additive dispensing system further comprises a manual activator, for example a push bar 48, in communication with the pump 32. The push bar 48 is configured to activate the pump 32 when pressure is applied to the push bar 48. The push bar 48, allows a user to manually selectively dispense an amount of additive to the filtered water.

Figure 5:
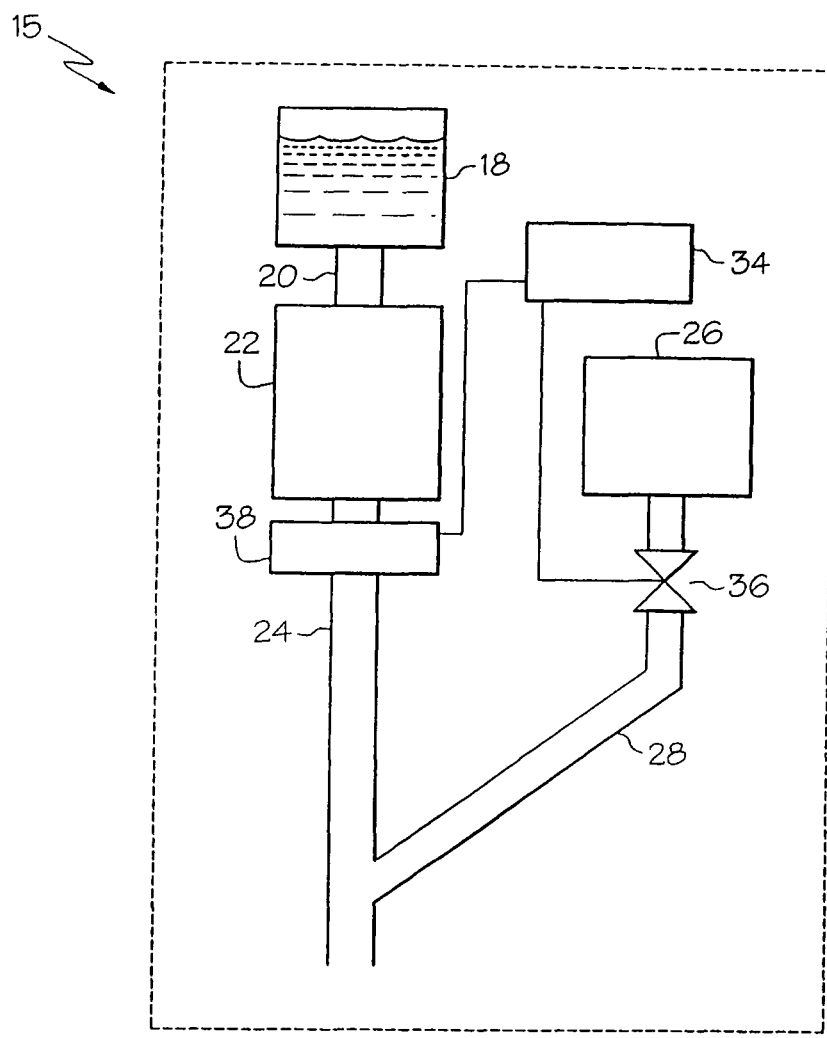
FIG. 5 is a schematic illustration of an exemplary water filtration system according to an embodiment of the present invention.

In one exemplary embodiment as illustrated in FIG. 5, the water filtration system 15 comprises a water inlet 20 in communication with an unfiltered water source 18, such as a water faucet. The water inlet 20 is in communication with the water filter 22. A mineral content analyzer 38 is in fluid communication with the outlet of the water filter 22. The mineral content analyzer 38 is operable to measure the concentration of one or more minerals in the filtered water. The water filtration system 15 further comprises a controller 34 in communication with the mineral content analyzer 38. A reservoir 26 containing one or more additives is in communication with an additive outlet 28 and a limiting valve 36. The limiting valve 36 is in communication with a controller 34, such that the controller 34 is operable to dispense one or more additives (such as minerals) to yield a predetermined concentration of additives in the filtered water. For example, the mineral content analyzer 38, detects a level of calcium in the filtered water and reports the calcium level to the controller 34. The controller 34 determines that additional calcium is desired in the final treated water product, and as such, sends a signal to the limiting valve 36 to add and/or increase the amount of additive (i.e. calcium) being dispensed through the additive outlet 28 to the filtered water. As one skilled in the art will appreciate, any controller known to one skilled in the art may be utilized to control the amount of additive dispensed into the filtered water.

Figure 6:
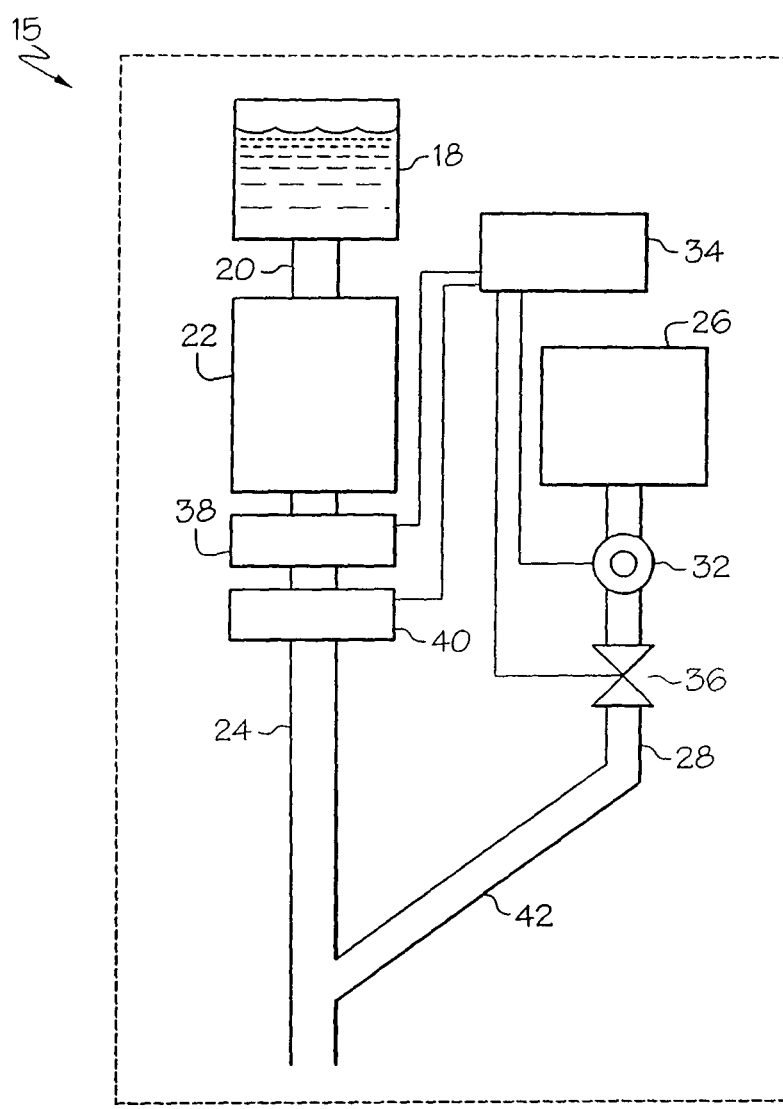
FIG. 6 is a schematic illustration of an exemplary water filtration system according to an embodiment of the present invention.

Another exemplary embodiment of the present invention is illustrated in FIG. 6. In this embodiment, the water filtration system 15 comprises a water inlet 20 connectable to an unfiltered water source 18. The water inlet 20 is in fluid communication with the water filter 22, such that unfiltered water from the unfiltered water source 18 flows through the water inlet 20 and through the water filter 22 toward the outlet 24. After the water has been filtered by the water filter 22, the water passes over a mineral content analyzer 38 and/or a flow meter 40. The mineral content analyzer 38 is operable to measure the concentration of one or more minerals in the filtered water. The flow meter 40 is operable to measure the flow rate of water exiting the water filter 22. The flow meter 40 is configured to send a signal to the controller 34, wherein the signal corresponds to a flow rate of water exiting the water filter 22. The controller 34 receives the mineral content signal for the mineral content analyzer 38 and a flow rate signal from the flow meter 40. The controller 34 then sends a signal to the pump 32 and/or the limiting valve 36 which are in communication with the reservoir 26. The signal from the controller 34 activates the pump 32 and/or limiting valve 36 to allow an amount of additive from the reservoir 26 to be dispensed through the additive outlet 28 to the filtered water. The amount of additive is a function of the signals received from the mineral content analyzer 38 and/or the flow meter 40. In an alternative embodiment, as shown in FIG. 6, an outlet mixer 42 is configured to place the additive outlet 28 in fluid communication with the outlet 24. In an alternative embodiment, the additive outlet 28 could be separate from the outlet 24 and not in fluid communication with each other. As one skilled in the art will appreciate, any sensor known to one skilled in the art may be utilized for detecting various components of the filtered water. An exemplary sensors includes a TDS (total dissolved solids) sensor from HM Digital of Los Angeles, Calif.

Figure 7:
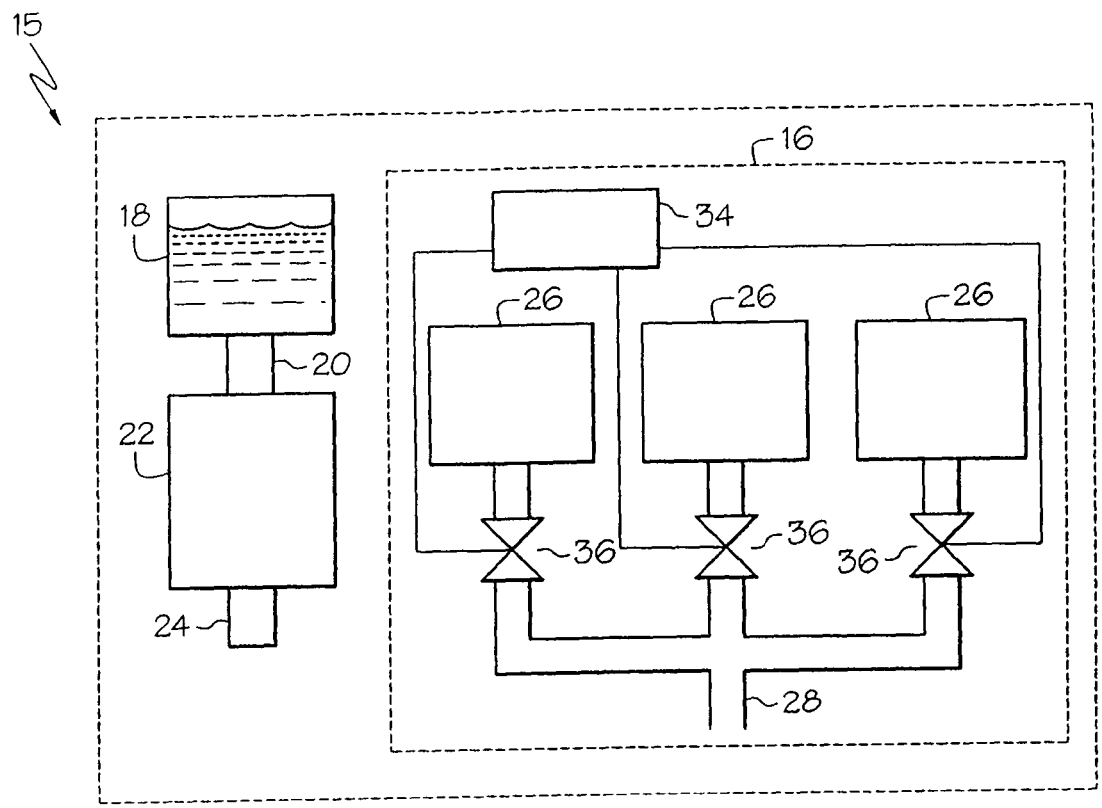
FIG. 7 is a schematic illustration of an exemplary water filtration system according to an embodiment of the present invention.

In another embodiment of the present invention, as illustrated in FIG. 7, the water filtration system 15 comprises a water inlet 20 connectable to an unfiltered water source 18, such as a faucet. The water inlet 20 is in fluid communication with the water filter 22. The water filter 22 is operable to filter the unfiltered water from the unfiltered water source 18 for one or more contaminants or pollutants. The filtered water from the water filter 22 is dispensed to the outlet 24. In this embodiment, the additive dispensing system 16 comprises a plurality of reservoirs 26. Each reservoir 26 comprises one or more additives to be selectively dispensed to the filtered water. A controller 34 is configured to allow a user to select which, if any, of the reservoirs 26 should dispense the additives to the filtered water. In one embodiment, the controller 34 sends a signal to the limiting valve 36 to regulate the flow of the additive through the additive outlet 28 to the filtered water. As discussed above, in one embodiment, the additive outlet 28 and the outlet 24 may be in fluid communication with each other or be joined with an outlet mixer 42. In an alternative embodiment, the reservoir 26 may comprise a plurality of chambers, wherein each chamber contains an additive to be dispensed to the filtered water.

Figure 8:
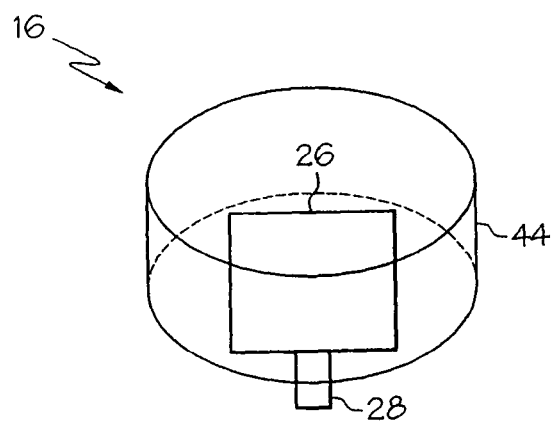
FIG. 8 is a schematic illustration of an exemplary additive dispensing system according to an embodiment of the present invention.

Another embodiment of the present invention is illustrated in FIG. 8. In this embodiment, the additive dispensing system 16 is configured to be added to a prior existing water filter of the user. This embodiment allows a user who already has purchased a water filtration system to add the novel additive dispensing system of the present invention. In this embodiment, a housing 44 is connected to the reservoir 26 and the additive outlet 28. The housing 44 is configured to attach to or slide over the user's existing water filter to allow the additive outlet 28 to be in proximity to the outlet of the existing water filter. In one embodiment, the additive outlet 28 comprises flexible tubing to be placed near the outlet of the existing water filter. In another embodiment, the housing 44 may be configured to replace a portion of the prior existing water filter. For example, the housing 44 may be configured to screw on and replace a component of the existing water filter housing.

In one embodiment, the reservoir 26 is releasably connected to the water filtration system 15. This allows the reservoir 26 to easily be changed when the reservoir 26 is empty or the user desires a different additive contained in a separate reservoir 26 to be added to the filtered drinking water. In one embodiment, the additive dispensing system is operable to selectively dispense from about 0.01 ml of additive to about 1.0 ml of additive per 250 ml of water filtered by the filter. In a further embodiment, the additive dispensing system is operable to selectively dispense from about 0.1 ml of additive to about 0.5 ml of additive per 250 ml of water filtered by the filter. In another embodiment, the additive dispensing system is operable to selectively dispense from about 0.025 to about 0.25% additive by volume of water filtered by the filter. In a further embodiment, the additive dispensing system is operable to selectively dispense from about 0.05 to about 0.1% additive by volume of water filtered by the filter.

Figure 9:
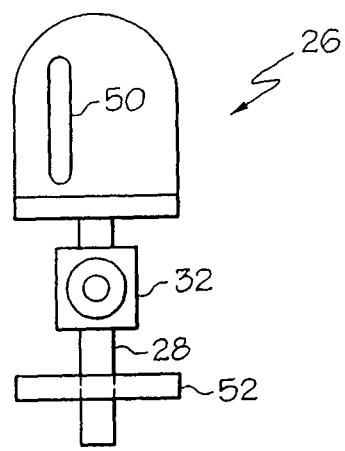
FIG. 9 is a schematic illustration of an exemplary additive dispensing system according to an embodiment of the present invention.

In yet another embodiment as illustrated in FIG. 9, the additive dispensing system 16 further comprises an additive life indicator 50 operable to indicate the remaining amount of additive in the reservoir 26. For example, the reservoir 26 may comprise a visible level gauge 50 to allow the user to determine the amount of additive remaining in the reservoir. In another embodiment, the additive dispensing system 16 may further comprise a totalizer 52 which is operable to calculate the amount of additive dispensed from the additive dispensing system 16, and configurable to indicate the remaining amount of additive remaining in the reservoir 26. In such an arrangement, a flow meter or totalizer is coupled to the additive life indicator and sends a signal to the additive life indicator to cause it to light up or flash after a predetermined volume of additive has flowed through the additive outlet. In an alternative embodiment, the life indicator may comprise a monitoring mechanism such as a microchip containing a programmable clock. The additive life indicator could be implemented as, for example, light emitting diodes or LCD (liquid crystal display) readouts, wherein a clock is programmed to cause the additive life indicator to, for example, light up or flash after a predetermined period of time has passed since installing a new reservoir, for example, two months. A user could then replace the reservoir with a new reservoir and reset the clock.

Other embodiments of the present invention are not limited to use with faucets or the like. For example, elements of the present invention could be adapted for use with portable containers such as pitchers, water bottles or with other drinking water delivery system such as water coolers. For example, one exemplary embodiment of the present invention, as illustrated in FIG. 10, comprises an attachment for a container 70 such as a pitcher or water bottle could be designed to include a filter 22 and a replaceable reservoir 26 containing additives. The additive outlet 28 could be placed near the outlet 24 of the container 70 to allow additives to be dispensed to the filtered water. Similarly, elements of the present invention could be installed into a water cooler or refrigerator, and operated by corresponding buttons, switches, and the like to selectively dispense an additive to filtered water.

Figure 11:
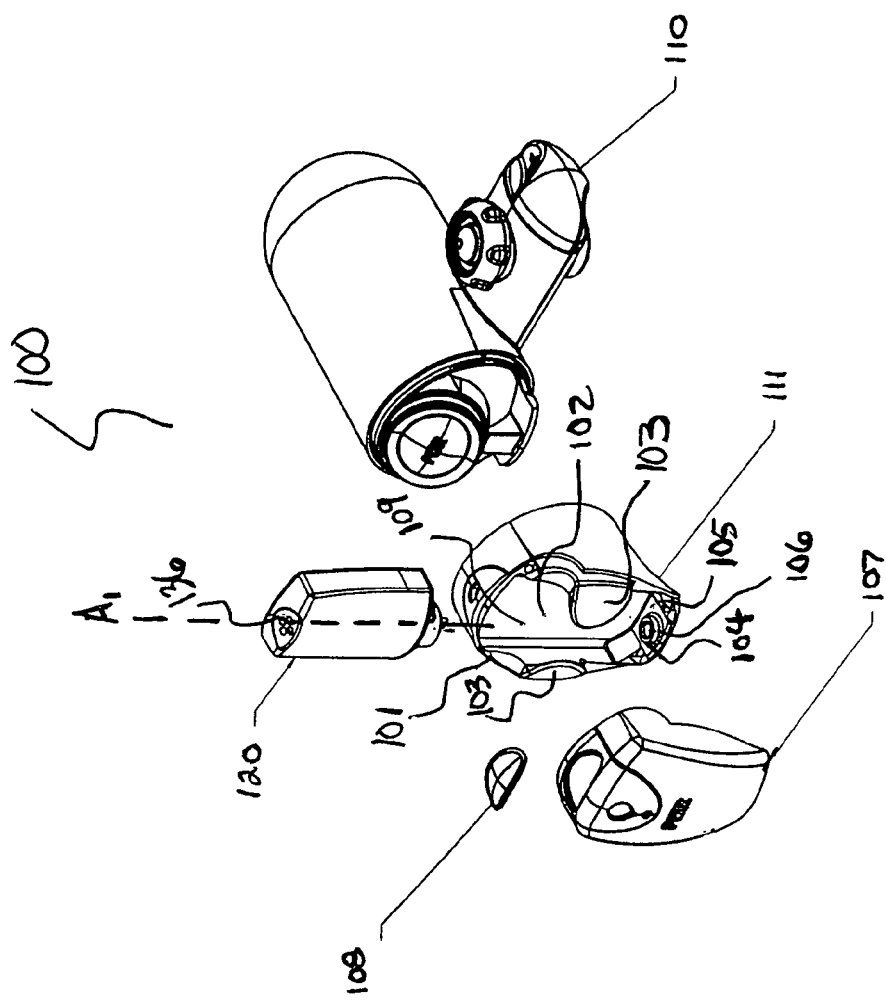
FIG. 11 is an exploded, perspective view of an exemplary additive dispensing system according to an embodiment of the present invention.
Figure 15:
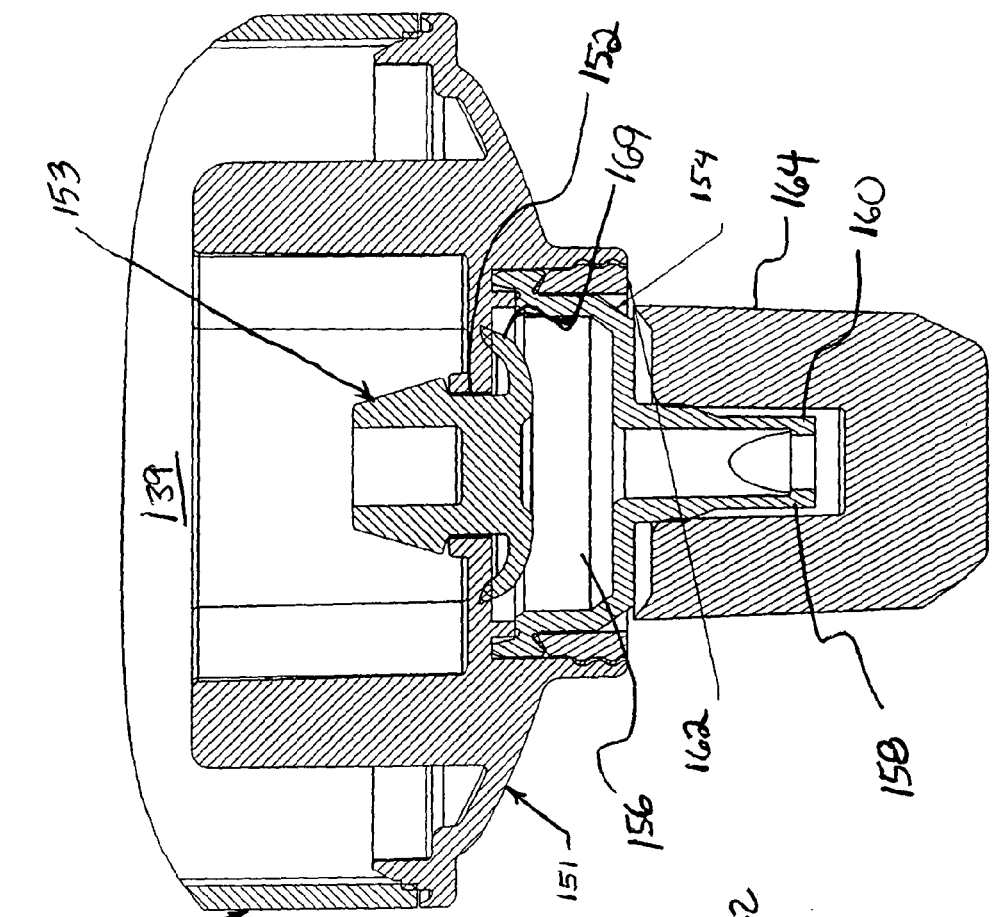
FIG. 15 is a cross sectional view of an cartridge according to FIG. 12.
Figure 16:
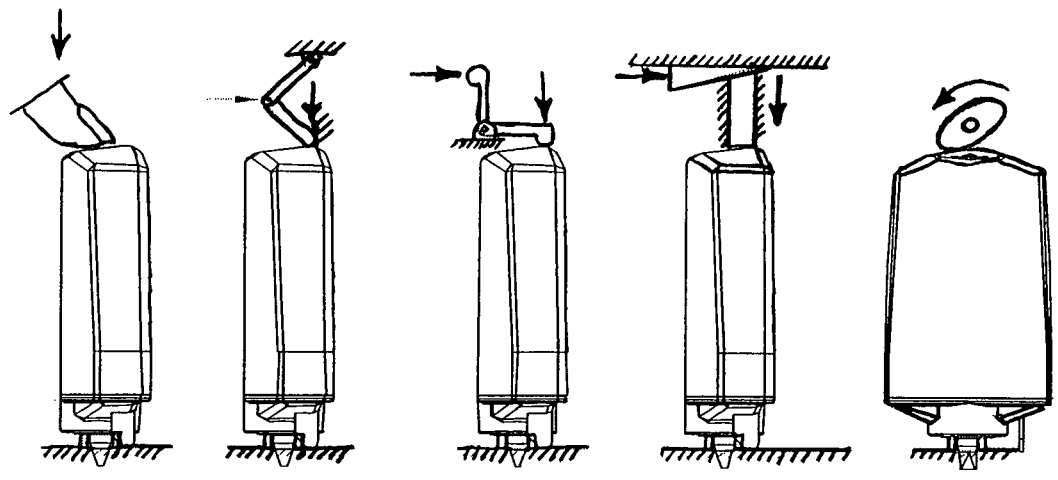
FIG. 16 is schematic illustration of exemplary actuation mechanisms for the additive dispensing system according to FIG. 11.
Figure 16:
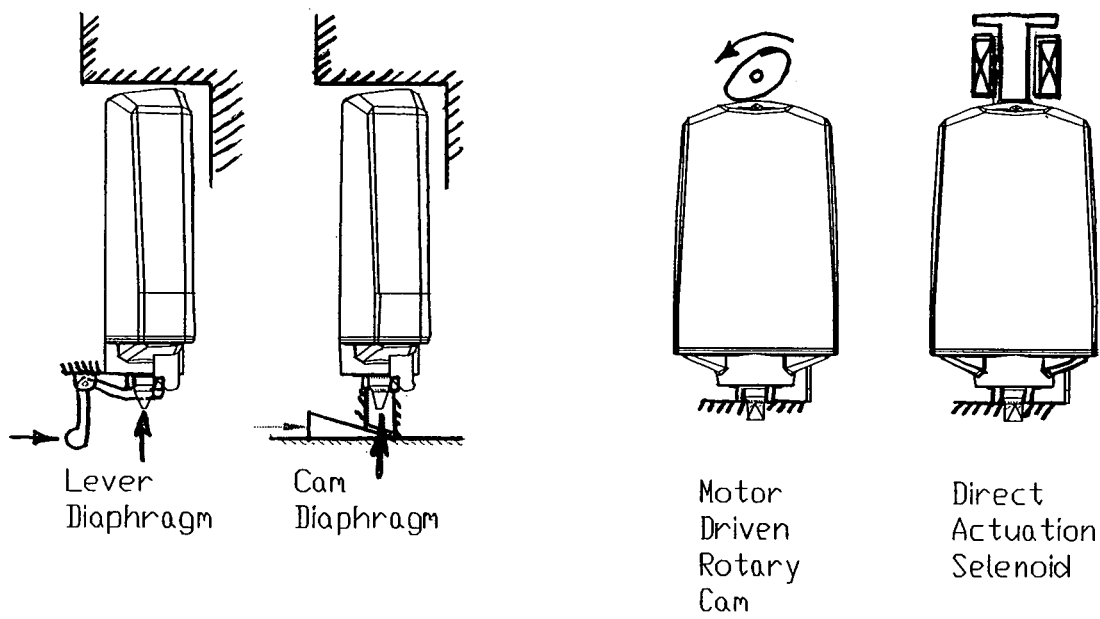

Referring to FIGS. 11-16, yet another exemplary embodiment of the present invention is illustrated. An additive dispensing system 100 of the present invention comprises a receptacle 101 and a cartridge 120 configured to contain a consumable additive and to selectively dispense the additive to a liquid (e.g., water). Additive dispensing system 100 may include one or more cartridges 120 and/or receptacles 101 without departing from the spirit and scope of the present invention. Receptacle 101 may include a space 102 and guides 103 configured to receive and hold cartridge 120 in space 102 such that cartridge 120 may move within receptacle 101. For example, cartridge 120 may slide within guides 103 along a longitudinal axis A1 of cartridge 120. Receptacle 101 may also include a pump activation device that is configured to operate the pump when cartridge 120 is positioned within receptacle 101. As shown in FIG. 11, the pump activation device is an annular protrusion 104 extending from a surface 105 of receptacle 101 and surrounding an aperture 106 that is disposed within surface 105. Other exemplary pump activation devices may include toggle mechanisms, levers, linear cams, rotary cams, and like mechanisms as shown in FIG. 16. Such mechanisms may apply a force to closed end 136 or to pump 150 and may be actuated manually or automatically (e.g., motor actuated, solenoid actuated).

In the exemplary embodiment shown, additive dispensing system 100 also optionally includes a cover 107 that removably connects to receptacle 101, enclosing cartridge 120 between receptacle 101 and cover 107. Cover 107 may provide protection from dirt and other debris from interfering with the movement of cartridge 120 within the receptacle. Cover 107 may also include a button 108 that movably connects to cover 107 and is configured to press against a closed end 136 (described later herein) of cartridge 120 when cartridge 120 is positioned within receptacle 101. Receptacle 101, cover 107, and button 108 may comprise any size, shape, and configuration without departing from the spirit and scope of the present invention. Exemplary materials of construction for receptacle 101, cover 107, and button 108 may include metals, plastics, composite materials, and combinations thereof. In one exemplary embodiment, polymers are used to construct the receptacle, cover, and button, for example, polypropylene (PP), polyethylene terephthalate (PET), high density polyethylene (HDPE), low density polyethylene (LDPE), polyvinyl chloride (PVC), polystyrene, nylon, polyester, elastomers, thermoplastic elastomers (TPE), silicone, neoprene, and any combinations thereof.

Receptacle 101 may be connected to, mounted to, or fabricated directly into a faucet mounted water filter system 110. As shown in FIG. 11, receptacle 101 is fabricated directly into a cap cover 111 of water filter system 110. Water filter system 110 may be any conventional water filter system as described herein and/or known to or yet-to-be developed by one of ordinary skill in the art. Exemplary embodiments of the water filter systems that may be included in the present invention are the PUR water filter systems commercially available from the Procter & Gamble Company of Cincinnati, Ohio.

Such a cartridge may be a replaceable and/or disposable cartridge. Being replaceable/disposable allows a user to remove cartridge 120 when the additive has been completely consumed, i.e., cartridge 120 is empty of the additive, and replace the depleted cartridge with a new, unused cartridge (e.g., a cartridge filled with an additive). Alternatively, additive dispensing system 100 allows a user to simply and easily replace a cartridge 120 containing a specific additive (e.g., lemon flavor) and replace it with a different desired additive (e.g., cherry flavor).

Figure 13:
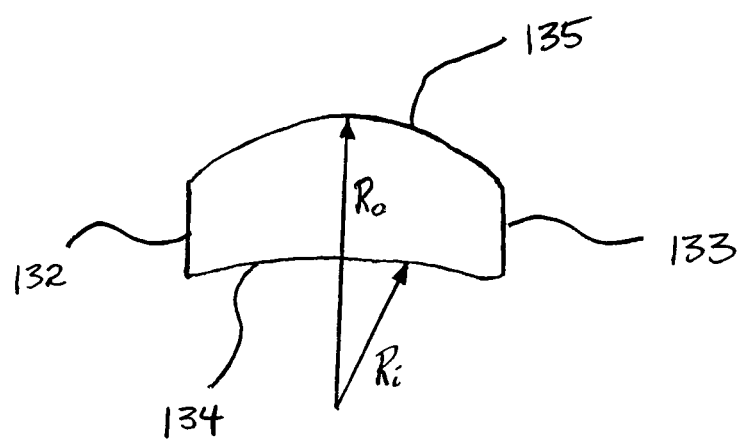
FIG. 13 is a cross sectional view of an exemplary housing for the cartridge according to FIG. 12.

In the exemplary embodiment, cartridge 120 includes a housing 130 having a reservoir 139, a bladder 140 disposed within reservoir 139, and a pump 150 connected to an open end 137 of housing 130 and in fluid communication with bladder 140. Housing 130 may include sidewalls 132, 133, 134, and 135, a closed end 136 and an open end 137. In this exemplary embodiment, sidewalls 134 and 135 are substantially curved such that housing 130 has a curved cross section as shown in FIG. 13. The curved shape of housing 130 is configured to permit cartridge 120 to function within multiple devices (e.g., water faucet mounted filter systems, pitcher mounted systems, portable additive dispensing systems, refrigerator, etc.). In addition, although the shape of housing 130 may be designed to permit it to function in multiple devices, it also may be configured to provide an ample reservoir volume for containing a reasonable amount of an additive. Thus, the exemplary embodiment of curved-shaped housing 130 provides a balance between the two. In addition, the cartridge has a width that permits two cartridges to fit into a water pitcher receptacle. An exemplary width of cartridge 120 is from about 0.5 inches to about 3.0 inches, another exemplary width of cartridge 120 ranges from about 1.0 inch to about 2.0 inches, particularly about 1.5 inches. Cartridge 120 may comprise a length from about 0.5 inches to about 4.0 inches, more particularly from about 2.0 inches to about 3.0 inches.

Housing 130 is curved to substantially wrap around a pressure vessel (e.g., faucet mounted filtration system 110). For example, sidewall 134 is curved to substantially conform or match the curvature of the outer housing (e.g., rear surface 109) of faucet filtration system 110. Sidewall 135 may also be curved to fit within curved cover 107 and/or to minimize the aesthetic effects of corners on the faucet mounted filter. Sidewall 135 is curved to substantially conform or match the curvature of cover 107 of water filtration system 110. In addition, sidewall's 134 substantially conformance to the curvature of rear surface 109 permits a tighter fit (i.e., a close tolerance fit) between receptacle 101 and cartridge 120. This allows cartridge 120 to move smoother and more efficiently within receptacle 101. FIG. 13 illustrates that the curved-shaped housing 130 includes two convex-shaped sidewalls 134 and 135 that are curved in the same general direction, i.e., the convex curvatures of both sidewalls 134 and 135 face the same direction as shown in FIG. 13. In one exemplary embodiment, curved sidewalls 134 and 135 are substantially parallel to one another. FIG. 13 also shows that the cross section of housing 130 includes an inner radius $R_i$ and an outer radius $R_o$. Inner radius may range from about 2.0 inches to about 10.0 inches and outer radius $R_o$ may range from about 0.5 inches to about 5.0 inches in one exemplary embodiment. In still another exemplary embodiment, inner radius may range from about 4.0 inches to about 6.0 inches and outer radius $R_o$ may range from about 1.5 inches to about 2.5 inches. It is understood that housing 130 may comprise a variety of known shapes, configurations, and sizes without departing from the spirit and scope of the present invention.

Housing 130 may be fabricated from any conventional materials as known to one of ordinary skill in the art. Such material may be substantially rigid material, semi-rigid material, flexible material, or any combination thereof. In the exemplary embodiment, housing 130 is fabricated from a substantially rigid material. Exemplary materials for housing 130 include, but are not limited to polymeric material, such as polypropylene (PP), polyethylene terephthalate (PET), high density polyethylene (HDPE), low density polyethylene (LDPE), polyvinyl chloride (PVC), polystyrene, nylon, polyester, and the like. In one exemplary embodiment, housing 130 is fabricated from high density polyethylene (HDPE) manufactured from DOW Plastics, with a grade of 12450N. In another exemplary embodiment, housing 130 may include a substantially rigid frame-work (i.e., without side walls 132, 133, 134, and 135) to minimize material costs and weight.

Referring back to FIG. 12, sidewalls 132, 133, 134, and 135 and closed end 136 of housing 130 define reservoir 139 within housing 130. Bladder 140 is inserted into reservoir 139. Bladder 140 may be any type of conventional bladder or line configured to contain an additive in liquid, gel, or powder form as known to one of ordinary skill in the art. In the exemplary embodiment, bladder 140 is a flexible, gusseted bag or pouch that includes a vapor barrier (not shown). Such a flexible bladder permits cartridge 120 to be positioned in any orientation (e.g., horizontal or vertical) and still permit substantially all of a liquid additive contained within bladder 140 to be dispensed from it without requiring a venting or pressure relief device to assist in dispensing the additive completely from bladder 140. As shown in FIG. 11, cartridge 120 is connected to water treatment system 110 and held in a vertical orientation. Bladder 140 may comprise single or multi-layered materials and/or laminates, including but not limited to foil laminates or metalized film bags, as known to one ordinary skill in the art. Such materials may include a vapor barrier or vapor barrier properties. These laminates or film bags may also include a polyethylene laminate on its sealing surfaces. One exemplary foil laminate is commercially available from Sonoco, Inc.

In the exemplary embodiment, pump 150 is configured to be a disposable along with cartridge 120. There are several benefits of configuring cartridge 120 to include a disposable pump versus designing the pump to be a permanent fixture of additive dispensing system 100 (e.g., connected to receptacle 101), and thus not disposable. First, a disposable pump (e.g., pump 150) eliminates the issue of bacteria growth within the pump due to additive accumulation (e.g., residue) within the pump after being dispensed by the pump.

Second, a disposable pump (e.g., pump 150) reduces pump reliability issues. If the pump was a permanent fixture of additive dispensing system 100, it would wear and breakdown over time due to repeated operations. Or, the pump would need to be fabricated to account for such repeated operation, which would increase its cost and weight. However, since pump 150 is replaced with the depletion of the additive within bladder 140, it may be configured to handle the number of pump operations required to deplete the amount of additive contained within bladder 140, making it a much cheaper pump. It also provides for an improved reliability for additive dispensing system 100. Third, if the pump is not replaced with the cartridge, then the additive accumulation of one type of additive (e.g., lemon flavor residue) within the pump may cross-contaminate a new additive (e.g., cherry flavor), thus providing a consumer a dissatisfying taste and experience. By making pump 150 disposable with cartridge 120, the cross-contamination of flavors within the pump is substantially eliminated. It is understood that cartridge 120 may be configured to be a reusable and/or refillable cartridge without departing from the spirit and scope of the present invention. However, since pump 150 will essentially be disposed of or replaced with every disposal or replacement of the consumable additive, it may be desirable to configure an inexpensive pump (e.g., pump 150) to selectively dispense the additive from bladder 140.

Figure 12:
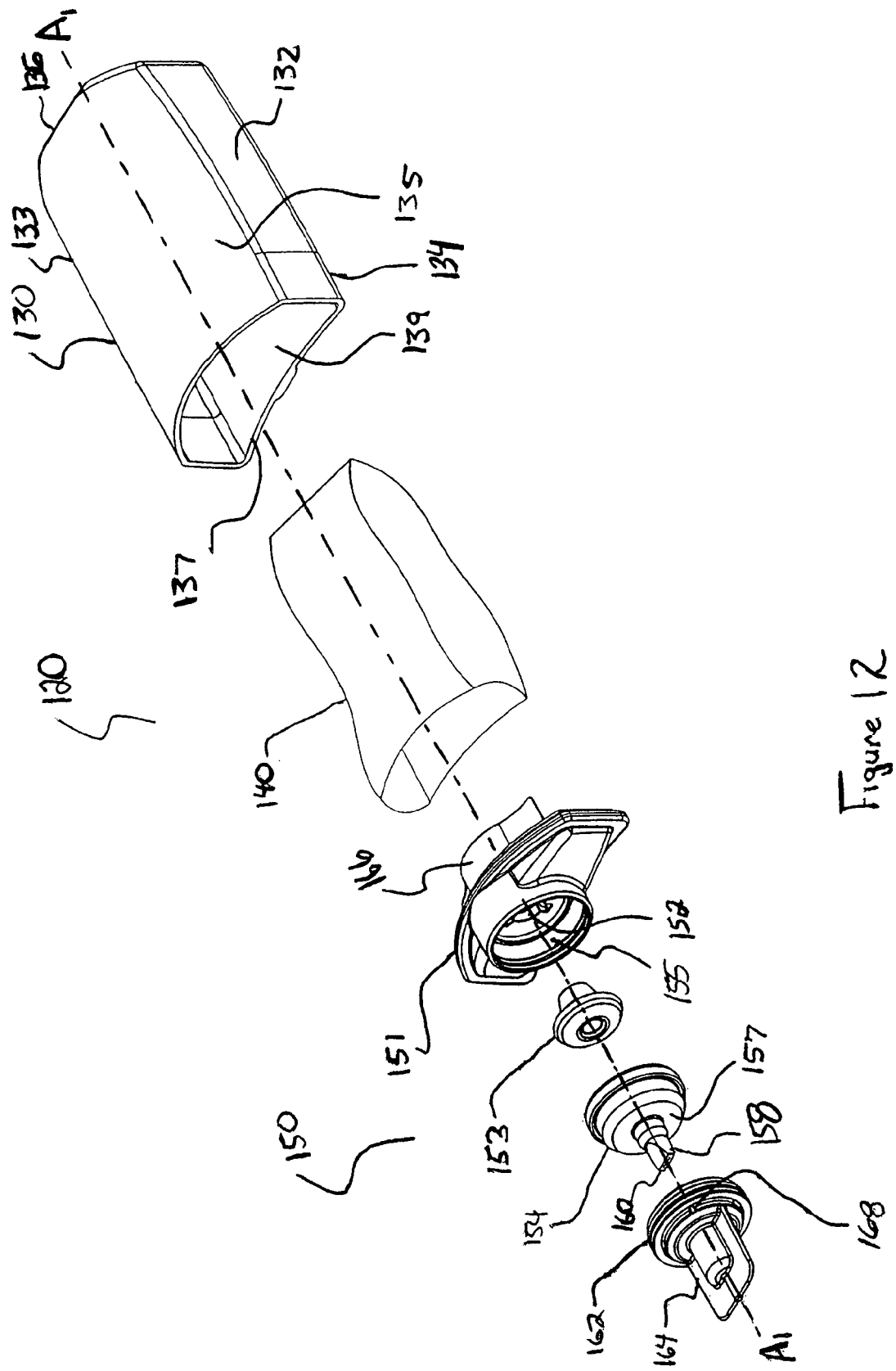
FIG. 12 is an exploded, perspective view of an exemplary cartridge according to an embodiment of the present invention.
Figure 14:
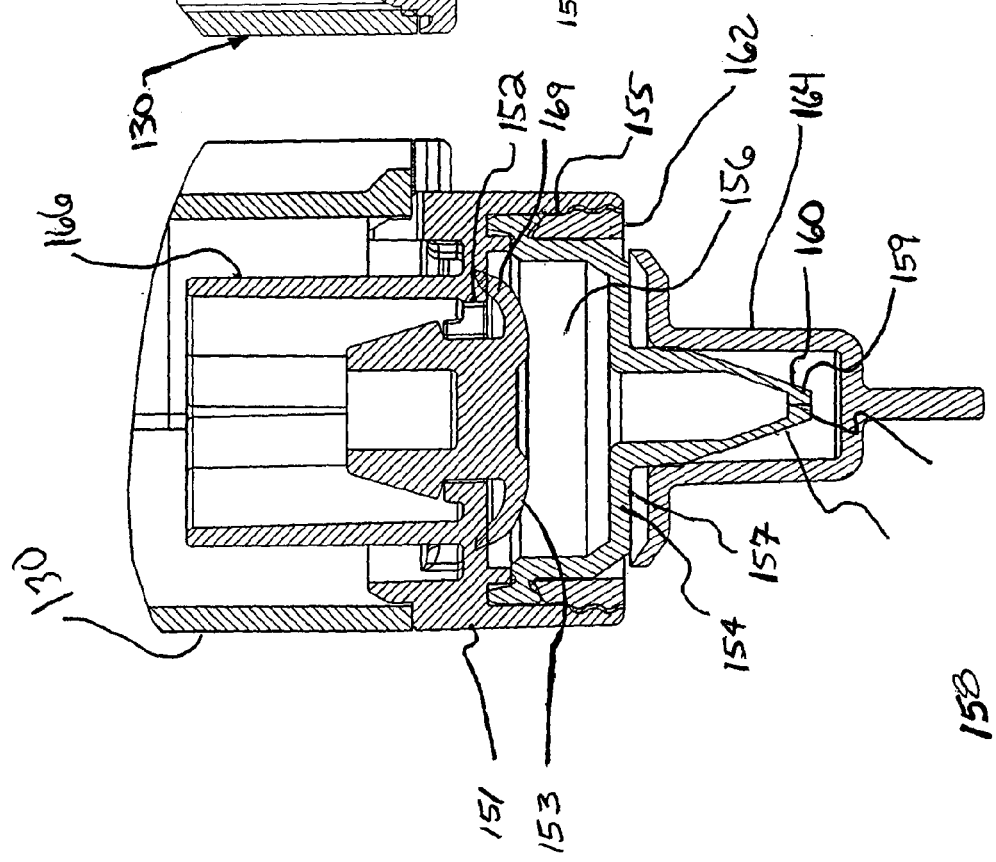
FIG. 14 is a cross sectional view of an exemplary cartridge according to FIG. 12.

The exemplary pump 150 shown in FIGS. 12, 14, and 15 includes a pump body 151 having a pump opening 152 disposed therethrough, an inlet check valve 153 positioned in pump opening 152 in a normally closed position, a diaphragm 154 disposed within a cavity 155 over inlet check valve 153, and an outlet check valve 158 disposed along diaphragm 154. As shown in FIG. 12, pump 150 is axially aligned with housing 130, which also axially aligns pump 150 with bladder 140. Axially aligned, as used herein, means that pump opening 152 is coaxially positioned along the housing's longitudinal axis A1. This axial alignment of pump 150 with housing 130 provides for improved pumping and dispensing of the additive from bladder 140. It permits a smaller pump to be used in cartridge 120 because the axial alignment reduces the required pumping forces. In the exemplary embodiment shown, bladder 140, pump body 151, inlet check valve 153, diaphragm 154, and outlet check valve 158 include a fluid flow path that runs along longitudinal axis A1 of housing 130.

Pump body 151 may be fabricated from a variety of conventional plastics such as high density polyethylene (HDPE). An exemplary HDPE is commercially available from Dow Plastic, grade 12450N. In this exemplary embodiment, inlet check valve 153 positioned in pump opening 152 functions as both a self-sealing seal (e.g., septum) for bladder 140 and a one-way check valve. This multi-functionality reduces the number of required components and thus the expense to fabricate cartridge 120. When diaphragm 154 is positioned over inlet check valve 153, it defines a dose chamber 156. Diaphragm 154 includes a planar surface 157 and an outlet check valve 158 that is integrated into diaphragm 154 such that it extends outwardly from planar surface 157 and is in fluid communication with chamber 156. Chamber 156 is also in fluid communication with inlet valve 153. Having diaphragm 154 and outlet check valve 158 integrated into one component reduces the expense of fabrication and the complexity of pump 150. Although inlet check valve 153 is described with multiple functionality (e.g., valve and seal) and diaphragm 154 is described as having outlet check valve 158 integrated therein, it is understood that a pump having a discrete seal, inlet check valve, diaphragm, and outlet check valve is within the spirit and scope of the present invention.

Outlet check valve 158 includes a pair of sealing surfaces 159 that are positioned on a distal end 160 of outlet check valve 158. Outlet check valve 158 is extended and configured such that once the additive being dispensed from cartridge 120 passes sealing surfaces 159, the additive has completely left the cartridge and will have no other contact with either cartridge 120 or receptacle 101. In other words, neither cartridge 120 nor receptacle 101 have dead space in its flow path downstream of sealing surfaces 159. Since both cartridge 120 and receptacle 101 have been configured to not include dead space downstream of sealing surfaces 159, neither provide any space for the dispensed additive to accumulate. Such accumulation of additive can cause resistance to the movement of the cartridge within the receptacle, bacteria growth, or cross-flavor contamination. Additive accumulation outside of the check valve, where it is partially exposed to air, can evaporate leaving a residue that can inhibit the operation of the pump. Similar to inlet check valve 153, outlet check valve 158 is configured to be normally closed position and is in fluid communication with dose chamber 156. In one exemplary embodiment, inlet check valve 153 is an umbrella valve and outlet check valve 158 is a duckbill valve. Inlet check valve 153, diaphragm 154, and outlet check valve 158 are made from a flexible material, particularly flexible material having memory. Exemplary materials of construction for inlet check valve 153, diaphragm 154, and outlet check valve 158 include, but are not limited to elastomers such as silicone, thermoplastic elastomer (TPE), buna, neoprene, EPDM. One exemplary TPE used to fabricate inlet check valve 153, diaphragm 154, and outlet check valve 158 is commercially available from West Pharmaceuticals, Inc.

Bladder 140 is sealed to a seal flange 166 of pump body 151 such that bladder 140 is in fluid communication with pump opening 152 and thus inlet check valve 153. Sealing bladder 140 to seal flange 166 of pump body 151 enables the elimination of a front sidewall (e.g., to cover open end 137) on housing 130, reducing weight and fabricating costs. Bladder 140 and pump body 151 are inserted into open end 137 of housing 130. Pump body 151 is connected to housing 130 with a heat seal. It is understood, that pump body 151 and housing 130 may be connected by any number of conventional technologies and methods as known to one of ordinary skill in the art, such as snap-fit connections, glue, etc. Cartridge 120 also includes a retainer 162 that connects (e.g., snap fit, heat seal, threaded engagement, etc.) into cavity 155 of pump body 150 to hold diaphragm 154 within cavity 155 of the pump body. Retainer 162 may also include a valve cap 164 that is connected to retainer 162 using snap pegs 168 as known to one of ordinary skill in the art. Such a cap protects outlet check valve 158 from being exposed to dirt, debris, and damage prior to use. Retainer 162 and cap 164 may be fabricated from plastic materials such as polypropylene. One exemplary material used to fabricate retainer 162 and cap 164 may be a homopolymer 4039 commercially available from BP Amoco Chemical Company. Cap 164 may simply be snapped off by twisting cap 164 to snap pegs 168.

It is understood that inlet and outlet valves 153 and 158 may comprise a variety of conventional one-way or check valves, such as ball valves, spring-loaded valves, or the like. In addition, as one skilled in the art will appreciate, any pump known to one skilled in the art such as positive displacement and centrifugal pumps may be utilized to dispense the additive from the bladder 140 to water within a container. Such exemplary embodiments include, but not limited to piston pumps, peristaltic pumps, bellows-type pumps, piezo-electric pumps, diaphragm pumps (e.g., as described above), rotary vane, etc. Alternatively, cartridge 120 may comprise, in place of pump 150, venture feed, gravity feed, and/or pressurized systems to dispense the additive from bladder 140 into the water.

To fill bladder 140 with an additive, as described herein, a hollow needle (not shown) is inserted into and through inlet check valve 153, which is acting as a seal enclosure over pump opening 152 (i.e., sealing bladder 140) to pull a vacuum within bladder 140. Once the vacuum has been established within bladder 140, the needle is removed. Due to its shape, configuration, and material, inlet check valve 153 automatically reseals the hole the needle created within the inlet check valve, acting as a self-sealing septum as known to one of ordinary skill in the art. A second needle of a syringe-type device (not shown herein) containing the additive is inserted into and through inlet check valve, enabling the additive to be dispensed into bladder 140. Again, due to the shape, configuration, and material of inlet check valve 153, the hole made by the needle reseals itself automatically (e.g., self-sealing septum). The needles and syringe-type device are well understood by one of ordinary skill in the art and will not be described herein.

In operation, cap 164 is twisted off of cartridge 120. Cartridge 120 is inserted into space 102 within guides 103 of receptacle 101 such that planar surface 157 of diaphragm 154 rests against annular protrusion 104, and outlet check valve 158 is inserted through aperture 106 of receptacle 101. Once inserted, a user may have to prime pump 150 to fill chamber 156 with an amount of the additive from bladder 140. For example, the user may selectively apply a force to closed end 136 in the direction of open end 137 (or pump 150) along longitudinal axis A1 of cartridge 120. When the force is applied to housing 130, it presses annular protrusion 104 against planar surface 157, which depresses diaphragm 154 causing outlet check valve 158 to open and chamber 156 to reduce in volume. Chamber's 156 reducing volume forces any substance (e.g., air or an additive) contained within chamber 156 to be dispensed through outlet check valve 158. Once the applied force is released from closed end 136, diaphragm 154 returns back to its normal position due to memory of diaphragm 154, expanding chamber 156 back to its normal volume. Such expansion of chamber 156 causes a vacuum within chamber 156 that bends an annular valve seal 169 of inlet check valve 153 away from pump body 151, opening inlet check valve 153. When inlet check valve 153 is opened, the vacuum within chamber 156 will also pull additive through pump opening 152 into chamber 156 from bladder 140.

Once diaphragm 154 and chamber 156 are back to its normal position, the inlet and outlet check valves are closed, preventing air from being sucked back into bladder 140 and chamber 156. This process may be repeated several times to prime the pump and fill the chamber 156 with the additive. The pump (and/or dose chamber) may be configured to hold a desired dose (i.e., a prequantified or measured amount of the additive) to be dispensed with one operation of the pump. Exemplary dose amounts of the additive to be dispensed with each pump operation includes from about 0.05 ml to about 1.0 ml. In another exemplary embodiment, the dose amount may include about 0.15 ml to about 0.25 ml. Once the chamber is filled with the desired amount of additive (i.e., primed), the cartridge is ready to dispense an amount of additive to water from chamber 156. When a dose of additive is desired, the user applies a force to close end 137 such that protrusion 104 depresses diaphragm 154, causing outlet check valve 158 to open and the amount of additive within chamber 156 to dispense from the outlet check valve 158. As the additive is dispensed from outlet check valve 158, an equal amount of the additive will be pulled from bladder 140 through inlet check valve 153 to replenish chamber 156.

Cartridge 120 and/or receptacle 101 may include a measuring device (not shown) to track and/or estimate the amount of additive that has been dispensed from the cartridge and the remaining amount of additive remaining in bladder 140. The measuring device may include but not be limited to a weight sensor to measure the amount of additive left within bladder 140, a dose counter, an electrical or electrode sensor to measure the change in resistivity of the fluid in the bladder, a RFID tag (Radio Frequency Identification), opacity sensor, or similar such devices as used in other industries where a remaining amount of a consumable in a reservoir is tracked such as, for example, in the inkjet industry. The measuring device need not be described herein as such technology is known to one of ordinary skill in the art. Cartridge 120 and/or receptacle 101 may also include the additive life indicator (not shown) as described above herein, which may be connected to the measuring device to indicate the remaining amount of additive in cartridge 120 measured by the measuring device. For example, cartridge 120 may comprise a visible level gauge (not shown) to allow the user to determine the amount of additive remaining in the reservoir. In addition, it is understood that cartridge 120 and/or receptacle 101 may include a communication link such as a TAB circuit or radio frequency connection to communicate data and signals between the cartridge, water filter system, and/or a computer or controller.

Figure 17:
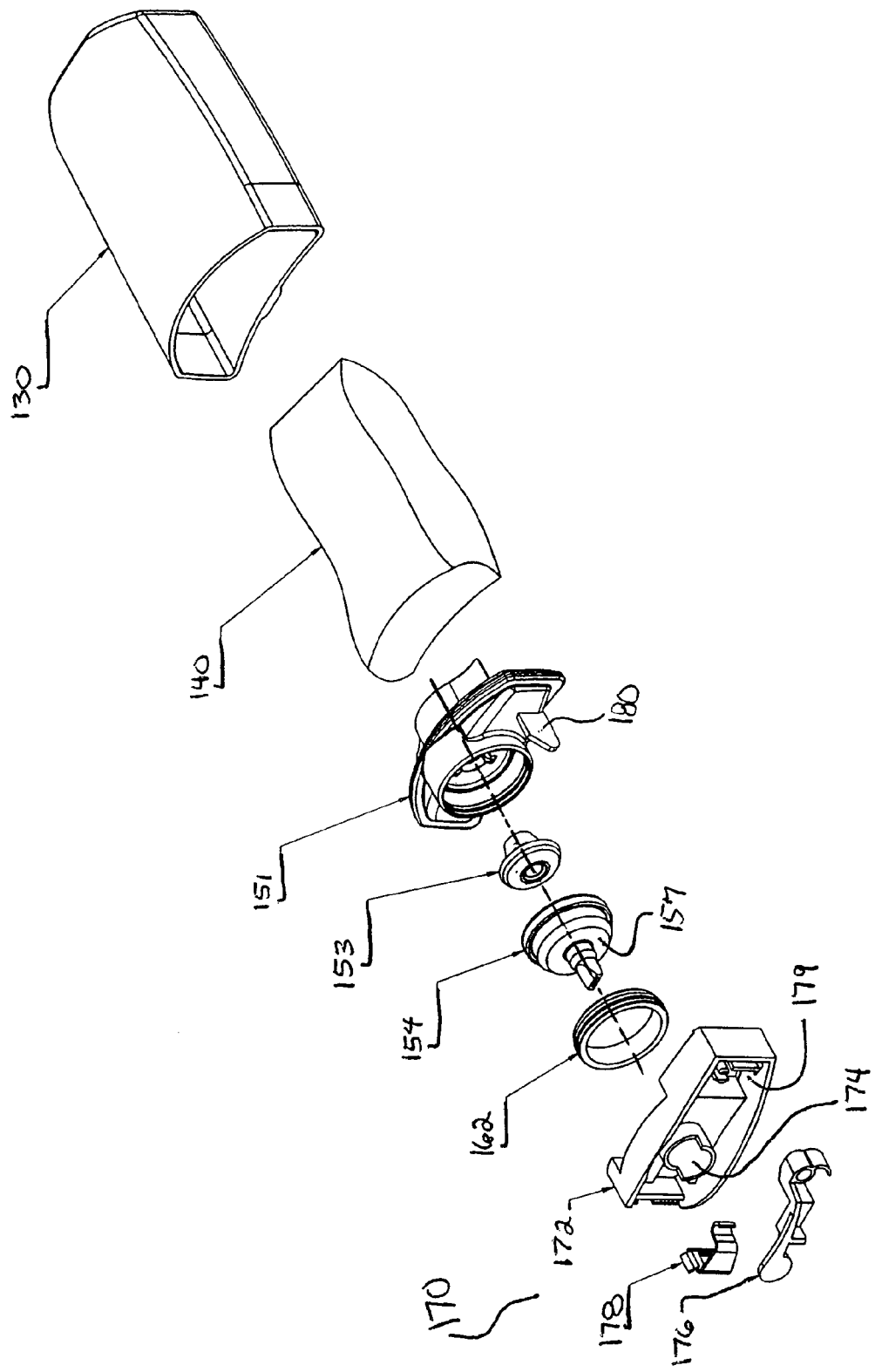
FIG. 17 is an exploded, perspective view of an exemplary additive dispensing system according to an embodiment of the present invention.

Referring to FIG. 17, receptacle 101 may comprise an interface 170, which may interconnect with cartridge 120. Interface 170 may be a discrete or integrated part of receptacle 101 to prevent dirt, debris, and other substances from entering into water filtration system 110 when cartridge 120 is not in receptacle 101. Interface 170 includes a body 172 having an interface opening 174, a door 176 configured to open or close opening 174, a spring 178 configured to bias cartridge 120 away from interface body 172 when cartridge 120 is positioned within interface 170, and a slot 179 disposed through body 172. Door 176 is in a normally closed position over opening 174. When cartridge 120 is positioned in receptacle 101, door 176 still remains closed over opening 174. However, when a user applies force to closed end 136, moving the cartridge toward the interface body 172, a door opening device 180 (e.g., a cam) positioned on pump body 151 slides through slot 179 to engage door 176. Door opening device 180 moves door 176 away from opening 174, and thus allowing outlet check valve 158 to move through opening 174 and dispense the additive from bladder 140. Once the applied force is removed, spring 178 moves cartridge 120 back away from interface body 172, thus disengaging door opening device 180 from door 176 and closing opening 174. It is also understood that interface 170 may be configured such that door 176 is in a normally closed position until cartridge 120 is inserted into interface 170 and door opening device 180 moves door 176 away from opening 174. In this configuration, interface 170 does not include a spring to bias cartridge 120 away from interface body 172. However, a spring may be used to bias door 176 to its normally closed position.

Figure 18:
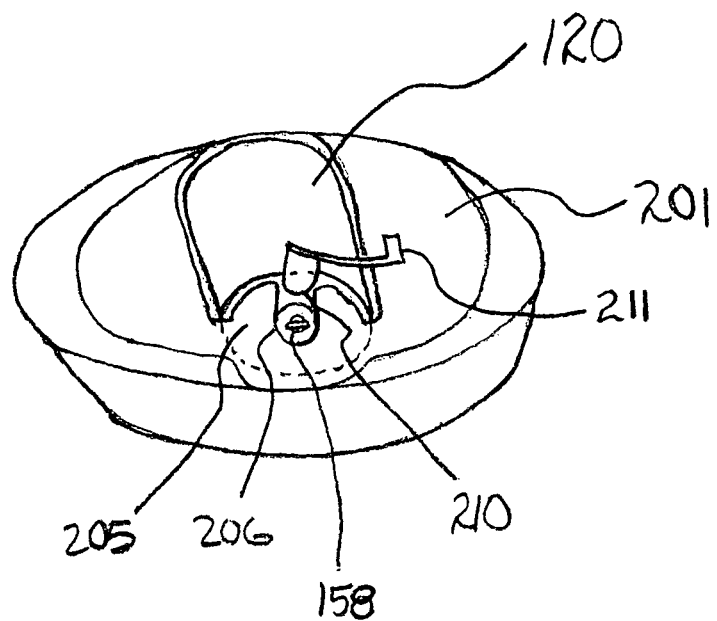
FIG. 18 is a perspective view of an exemplary additive dispensing system according to an embodiment of the present invention.

Another exemplary embodiment of the present invention is illustrated in FIG. 18. In this embodiment, additive dispensing system 200 may include a receptacle 201 configured to receive cartridge 120 in a moving engagement. Receptacle 201 may include a door 210 connected to receptacle 201 near an aperture 206 disposed within a surface 205 of receptacle 201. Door 210 is configured to open and close aperture 206, thus preventing or permitting outlet check valve 158 of cartridge 120 to enter into aperture 206 and through surface 205. A distal end 211 of door 210 is fixedly attached to receptacle 201 such that door 210 is cantilevered from receptacle 201 over aperture 206. In addition, door 210 is spring-biased in a closed position over aperture 206. In this embodiment, door 210 is fabricated from a material having memory or a spring constant that provides this spring-biased. Alternatively, receptacle 201 may include a separate spring (not shown) that engages door 210 to bias it in the closed position over aperture 206. Either cartridge 120 or door 210 may have a cam (not shown) that engages door 210, or vice versa. When a force is applied to cartridge 120 to operate pump 150, the cam moves door 210 away from aperture 206, allowing outlet check valve 158 to dispense the additive through aperture 206 and into a container.

Additive dispensing system 100, including cartridge 120 and receptacle 101, is not limited to use with faucets or the like. For example, elements of the present invention could be adapted for use with portable containers such as pitchers, water bottles or with other drinking water delivery system such as water coolers. For example, receptacle 101 may be connected to or be integrated into a pitcher (not shown) or similar device, which include a water filtration system (not shown), wherein cartridge 120 may be configured to selectively dispense an additive into the filtered water either held in the pitcher or in a container the filtered water has been poured into from the pitcher.

Figure 19:
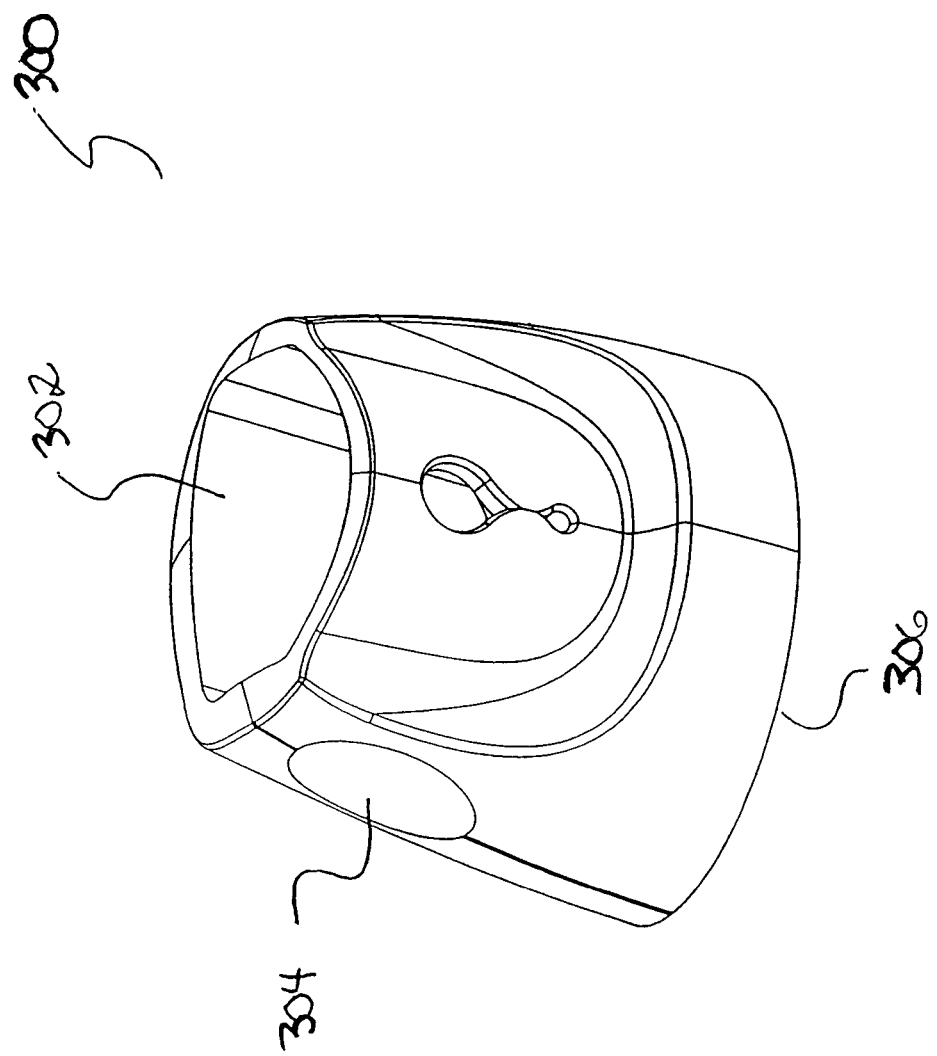
FIG. 19 is a perspective view of an exemplary receptacle for the additive dispensing system according to an embodiment of the present invention.

Referring to FIG. 19, another exemplary embodiment of a receptacle 300 is shown. Receptacle 300 includes a space 302 configured to receive cartridge 120 as described herein. Receptacle 300 may include guides (not shown) internal to space 302 that are configured to slidingly engage cartridge 120 such that cartridge 120 may slide into space 302 within receptacle 300. Receptacle 300 may include a pump activating device (not shown) (e.g., an annular protrusion 104) and an opening (not shown) disposed within sidewall 306, which allows outlet check valve 158 to protrude through when cartridge 120 is inserted within receptacle 300. In this exemplary embodiment, receptacle 300 may be a hand held device, permitting receptacle 300 and cartridge 120 to be portable. Alternatively, receptacle 300 may be configured to be mounted to a stationary fixture (e.g., a wall). In the exemplary embodiment shown, receptacle 300 includes finger grip points 304 disposed along opposite sides of receptacle 300 to provide improved handling of receptacle 300 and thus improved dispensing of the additive from cartridge 120. When cartridge 120 is positioned within receptacle 300, a user may hold receptacle 300 between two fingers (and/or a thumb) and use a third finger to apply a force to close end 136 of cartridge 120 to operate pump 150 to selectively dispense the additive from cartridge 120.

Figure 20:
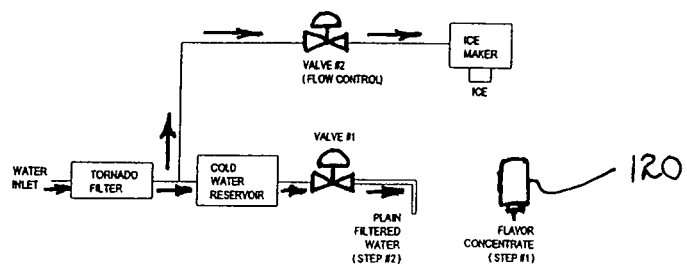
FIG. 20 is a schematic illustration of an exemplary additive dispensing system for a refrigerator according to an embodiment of the present invention.

In another embodiment of the present invention as illustrated in FIG. 20, the additive dispensing system 420 of the present invention is positioned substantially adjacent or near a water dispensing system (e.g., a water filtration system 400) on a refrigerator (not shown) such that a user may easily and conveniently dispense an additive (e.g., flavoring) and then dispense filtered water into a container (e.g., a glass) or vice versa. Water filtration system 400 may include a water inlet 402, a water filter 404 in fluid communication with water inlet 402, a water reservoir 406 in fluid communication with water filter 404, a first water valve 408 in fluid communication with water reservoir 406, and a water outlet 410 in fluid communication with first water valve 408. Water reservoir 406 may be configured to store a quantity of water (e.g., cold filtered water). First water valve 408 may be operable to dispense and control the flow of filtered water from water reservoir 406 to and out of water outlet 410.

Water filtration system 400 may also include a second water valve 412 that is connected to the water filtration system between and is placed in fluid communication with water filter 404 and water reservoir 406. In addition, water filtration system 400 may include an ice machine 414 in fluid communication with second water valve 412. First and second water valves 408 and 412 may be connected to manual actuators configured to open and close the water valve. Alternatively, first and second water valves 408 and 412 may be placed in electrical communication with a controller (not shown) and an actuator (not shown) configured to control the water valve's operation to initiate and terminate the dispensing of water out of water outlet 410. Such manual and electrical valve controls are known to one skilled in the art and need not be described herein.

Additive dispensing system 420 may comprise additive dispensing cartridge 120 and receptacle 101 as described above herein and shown in FIGS. 11-19. In this exemplary embodiment, additive dispensing system 420 is discrete from water filtration system 400 and/or the refrigerator. In other words, additive dispensing system 420 is not permanently or fixedly integrated into or connected to water filtration system 400 or the refrigerator. For example, receptacle 101 may be temporarily and/or removably connected onto or attached to the refrigerator (e.g., magnetized backing, pressure sensitive adhesion, screws, snap-fit connects, or other removable connections, etc.). In this embodiment, receptacle 101 is positioned or located such that when cartridge 120 is inserted into receptacle 101, additive dispensing system 410 (e.g., outlet check valve 158) is positioned substantially near water outlet 410 of water filtration system 400 as shown in FIG. 20. Receptacle 101 may also be attached or connected to a fixture located substantially near the refrigerator (e.g., a wall, cabinet, etc.), instead of on the refrigerator, by any device or method as known to one of ordinary skill in the art (e.g., screws, nails, glue, pressure sensitive adhesive, etc.). In this embodiment, receptacle 101 is positioned such that when cartridge 120 is inserted into receptacle 101, additive dispensing system 410 is substantially near water outlet water filtration system 400 as shown in FIG. 20. It is understood that a variety of technologies and methods may be used to attach receptacle 101 near water outlet 410 as known to one of ordinary skill in the art without departing from the spirit and scope of the present invention.

Alternatively, additive dispensing system 420 may be configured such that all or a portion of additive dispensing system 420 is integrated into water filtration system 400 or the refrigerator. For example, receptacle 101 may be connected to or integrated into a dispensing cove (e.g., dispensing cove 630, FIG. 24) of the refrigerator such that outlet check valve 158 is positioned substantially adjacent to water outlet 410. In this embodiment, receptacle 101 may be permanently integrated into the cove or removably connected to the cove such that it may be removed for cleaning and/or repair and cartridge 120 is removably inserted into receptacle 101 as described herein.

In this exemplary embodiment, additive dispensing system 420 may be actuated by a user applying a force with a finger on closed end 36 toward pump 150 as shown in FIG. 20. Such applied force to closed end 136 causes cartridge 120 to move within receptacle 101, forcing diaphragm 154 against protrusion 104. When diaphragm presses again protrusion 104, it collapses, causing pump 150 to operate dispensing an amount (e.g., dose) of additive from cartridge 120. The user may manually control the dosing of the additive into the container, i.e., manual proportioning. For example, the user manually actuates cartridge 120 (i.e., pump 150) a certain number of times to dispense the required amount of additive necessary to form the proper ratio of additive to water (to be dispensed or already dispensed) within the container (i.e., manual proportioning). It is understood that other methods or mechanisms may be used to actuate cartridge 120, and ultimately, pump 150. Referring to FIG. 16, other exemplary mechanisms to actuate cartridge 120 (i.e., to operate pump 150) include a toggle mechanism, lever mechanism, linear cam, rotary cam, and like mechanisms. Such mechanisms may be manually, motively (e.g., motor actuated), or electrically actuated (e.g., fingers, cams, levers, motors, solenoids, etc.) to actuate cartridge 120 (e.g., engaging housing 130 or pump 150) without departing from the spirit and scope of the present invention. Such mechanisms are known to one of ordinary skill in the art and need not be described herein.

In this exemplary embodiment, the user may actuate cartridge 120 to selectively dispense the amount of additive into the container, and then place the container under water outlet 410. Once the container is under water outlet 410, the user may actuate water filtration system 400, using any conventional water dispensing actuators as known to one of ordinary skill in the art such as manual or electronic actuators, to dispense the filtered water from reservoir 406 out of water outlet 410 into the container, which may mix with the dispensed additive in the container. Alternatively, the filtered water may be dispensed into the container first, and then the container moved to outlet check valve 158 to then selectively dispense an amount of additive into the water in the container.

Figure 21:
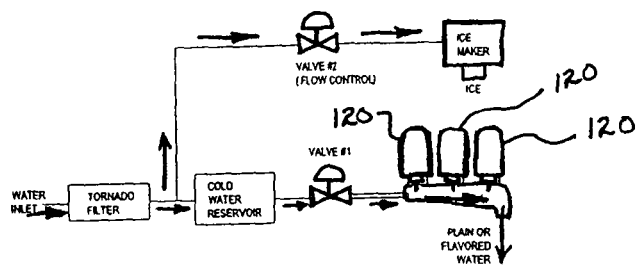
FIG. 21 is a schematic illustration of an exemplary additive dispensing system for a refrigerator according to an embodiment of the present invention.

In another embodiment of the present invention as illustrated in FIG. 21, a water filtration system 500 for a refrigerator comprises an additive dispensing system 520 integrated into water filtration system 500 such that additive dispensing system 520 is in fluid communication with water filtration system 500. Water filtration system 500 permits a user to easily and conveniently selectively dispense an additive (e.g., flavoring) into filtered water as it is being dispensed from the refrigerator into a container (e.g., a glass). Water filtration system 500 may also include a water inlet 502, a water filter 504 in fluid communication with water inlet 502, a water reservoir 506 in fluid communication with water filter 504, a first water valve 508 in fluid communication with water reservoir 506, and a water outlet 510 in fluid communication with first water valve 508. Water reservoir 506 may be configured to store a quantity of water (e.g., cold filtered water). First water valve 508 may be operable to dispense and control the flow of filtered water from water reservoir 506 to and out of water outlet 510.

Water filtration system 500 may also include a second water valve 512 that is connected to the water filtration system between and is placed in fluid communication with water filter 504 and water reservoir 506. In addition, water filtration system 500 may include an ice machine 514 in fluid communication with second water valve 512. First and second water valves 508 and 512 may be connected to manual actuators configured to open and close the water valve. Alternatively, first and second water valves 508 and 512 may be placed in electrical communication with a controller (not shown) and an actuator (not shown) configured to control the water valve's operation to initiate and terminate the dispensing of water out of water outlet 510. Such manual and electrical valve controls are known to one skilled in the art and need not be described herein.

Additive dispensing system 520 may comprise additive dispensing cartridge 120 and receptacle 101 as described above herein and shown in FIGS. 11-19. As described above, additive dispensing system 520 is integrated into water filtration system 500 and/or the refrigerator. For example, receptacle 101 may be connected to or integrated into a dispensing cove (e.g., dispensing cove 630, FIG. 24) of the refrigerator such that outlet check valve 158 of cartridge 120 may dispense the additive into water outlet 510 of water filtration system 500 as illustrated in FIG. 21. Receptacle 101 may be permanently integrated into the cove or removably connected to the cove (or the refrigerator) such that it may be removed for cleaning and/or repair. In addition, cartridge 120 is removably inserted into receptacle 101 as described herein. In this embodiment, water outlet 510 may include a section that is a partially open structure (e.g., trough-like) that channels the filtered water under one or more additive cartridges 120. Cartridges 120 are positioned such that they may dispense the additive directly into the water outlet 510 (e.g., trough) as the filtered water flows through water outlet 510 and into the container as an additive/filtered water mix. Alternatively outlet check valve 158 may be removably connected to water outlet 510 (e.g., tubing, filter additive inlets that connect to outlet check valve 158, etc.) to form a closed system (i.e., no open trough).

In this exemplary embodiment, additive dispensing system 520 may be actuated by a user applying a force with a finger on closed end 36 toward pump 150 as shown in FIG. 21. Such applied force to closed end 136 causes cartridge 120 to move within receptacle 101, forcing diaphragm 154 against protrusion 104. When diaphragm presses again protrusion 104, it collapses, causing pump 150 to operate dispensing an amount (e.g., dose) of additive from cartridge 120. The user may manually control the dosing of the additive into the container, i.e., manual proportioning. For example, the user manually actuates cartridge 120 (i.e., pump 150) a certain number of times to dispense the required amount of additive necessary to form the proper ratio of additive to water (to be dispensed or already dispensed) within the container (i.e., manual proportioning). It is understood that other methods or mechanisms may be used to actuate cartridge 120, and ultimately, pump 150. Referring back to FIG. 16, other exemplary mechanisms to actuate cartridge 120 (i.e., to operate pump 150) include a toggle mechanism, lever mechanism, linear cam, rotary cam, and like mechanisms. Such mechanisms may be manually, motively, or electrically actuated (e.g., fingers, cams, levers, motors, solenoids, etc.) without departing from the spirit-and-scope of the present invention. Such mechanisms are known to one of ordinary skill in the art and need not be described herein. Cartridge 120 may be in electrical communication with a user interface, which signals a motor or solenoid to actuate cartridge 120 to selectively dispense the amount of additive into water outlet 510.

In this exemplary embodiment, when user places a container under water outlet 510 and actuates water filtration system 500 (by any conventional methods known to one of ordinary skill in the art) to dispense filtered water, filtered water is dispensed from reservoir 506 into water outlet 510. If the user desires an additive to be dispensed into the water, then the user actuates cartridge 120 (via manual or electrically) to selectively dispense the amount of additive into water outlet 510. The additive mixes with the filtered water in water outlet 510 and is dispensed into the container.

Figure 22:
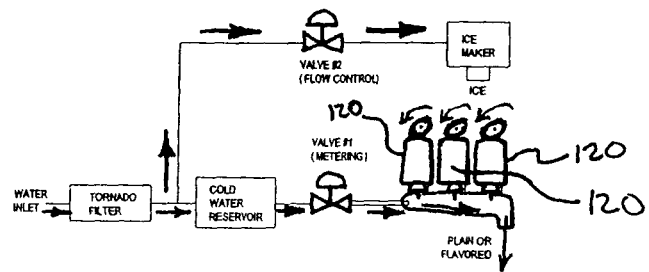
FIG. 22 is a schematic illustration of an exemplary additive dispensing system for a refrigerator according to an embodiment of the present invention.

FIG. 22 illustrates another exemplary embodiment of water filtration system 500, wherein first valve 508 is configured to meter the flow of water (e.g., volumetric flow). Such a metering valve permits for water filtration system 500 to automatically control the proportioning of the filtered water to the dispensed additive (i.e., automatic proportioning). Automatic proportioning, as used herein, is the automatic dispensing and/or control of both the water and the additive to dispense the proper ratio of water to additive to ensure the proper concentration of additive for the amount of water. The metering first valve 508 may be in electrically communication with optional components to water filtration system 500, such as a controller (not shown), computer (not shown), and/or user selection interface (not shown), wherein a user may select a desired concentration level of additive and a desired amount of water to be dispensed from water filtration system 500. First valve 508 measures, calculates, and/or estimates the flow of water passing from water filter 504 to water outlet 510 to determine the amount of dispensed filtered water. Based upon this measured amount of dispensed filtered water and the selected additive concentration level, water filtration system 500 controls first valve 508 and automatically actuates cartridge 120 to dispense the proper amounts of filtered water and additive to dispense the properly proportioned water/additive mixture into the container. It is understood that the user selection interface may be configured to permit that user to select the amount (e.g., volume) of filtered water desired to be dispensed, which water filtration system 500 and first valve 508 would use to automatically proportion the proper amounts of water and additive during dispensing of the water/additive into the container. If the user selects just plain filtered water, water filtration system 500 operates first valve 508 to dispense filtered water from reservoir 508 but does not actuate cartridge 120.

Figure 23:
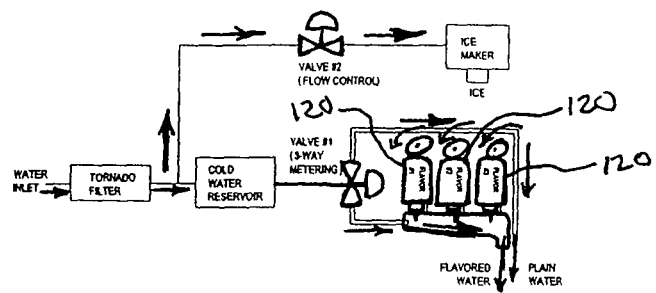
FIG. 23 is a schematic illustration of an exemplary additive dispensing system for a refrigerator according to an embodiment of the present invention.

FIG. 23 illustrates another exemplary embodiment of water filtration system 500. In this exemplary embodiment water filtration system may include all the components described herein, particularly with reference to FIG. 22. Water filtration system 500, in this embodiment, may include water outlet 510 and a bypass water outlet 509. Cartridge 120 is positioned such that outlet check valve 158 is in fluid communication with water outlet 510. As described above, water outlet 510 may be either an open trough-like channel that directs the filtered water under the cartridge such that cartridge 120 may dispense an amount of additive into water outlet 510 or water outlet 510 may be removable connected to water outlet 510 in a closed system (i.e., no open trough-like channel). In this embodiment, first valve 508 comprises a three-way metering valve having a valve inlet 512, a first valve outlet 514, and a second valve outlet 516. Valve inlet 512 is in fluid communication with water reservoir 506. First valve outlet 514 is in fluid communication with water outlet 510 and second valve outlet 516 is in fluid communication with bypass water outlet 509.

First valve 508 is configured to measure and/or meter the flow (e.g., volumetric flow) of filtered water dispensing from reservoir 506 into one or both of water outlet 510 and bypass water outlet 509 through first and second valve outlets 514 and 516. Such a metering valve permits for water filtration system 500 to automatically control the ratio of the filtered water to the dispensed additive (i.e., automatic proportioning) being dispensed from water outlet 510. Automatic proportioning, as used herein, is the automatic dispensing and/or control of both the water and the additive to dispense the proper ratio of water to additive to ensure the proper concentration of additive for the amount of water. The metering first valve 508 may be in electrically communication with optional components to water filtration system 500, such as a controller (not shown), computer (not shown), and/or user selection interface (not shown), wherein a user may select a desired concentration level of additive.

First valve 508 measures, calculates, and/or estimates the flow of water passing from water filter 504 through first valve 508 (e.g., through first valve outlet 514 to water outlet 510) to determine the amount of dispensed filtered water. Based upon this measured amount of dispensed filtered water and the selected additive concentration level, water filtration system 500 controls first valve 508 and automatically actuates cartridge 120 to dispense the proper amounts of filtered water and additive to dispense the properly proportioned water/additive mixture into the container. In this scenario, second valve outlet 516 is closed, preventing the flow of water to bypass water outlet 509. It is understood that the user selection interface may be configured to permit that user to select the amount (e.g., volume) of filtered water desired to be dispensed, which water filtration system 500 and first valve 508 would use to automatically proportion the proper amounts of water and additive during dispensing of the water/additive into the container. In this exemplary embodiment, if the user selects just plain filtered water (i.e., no additive), water filtration system 500 activates first valve 508 to close first valve outlet 514 and open second valve outlet 516 to dispense filter water from reservoir 506 through bypass outlet 509, which has not been exposed to the additive.

Figure 24:
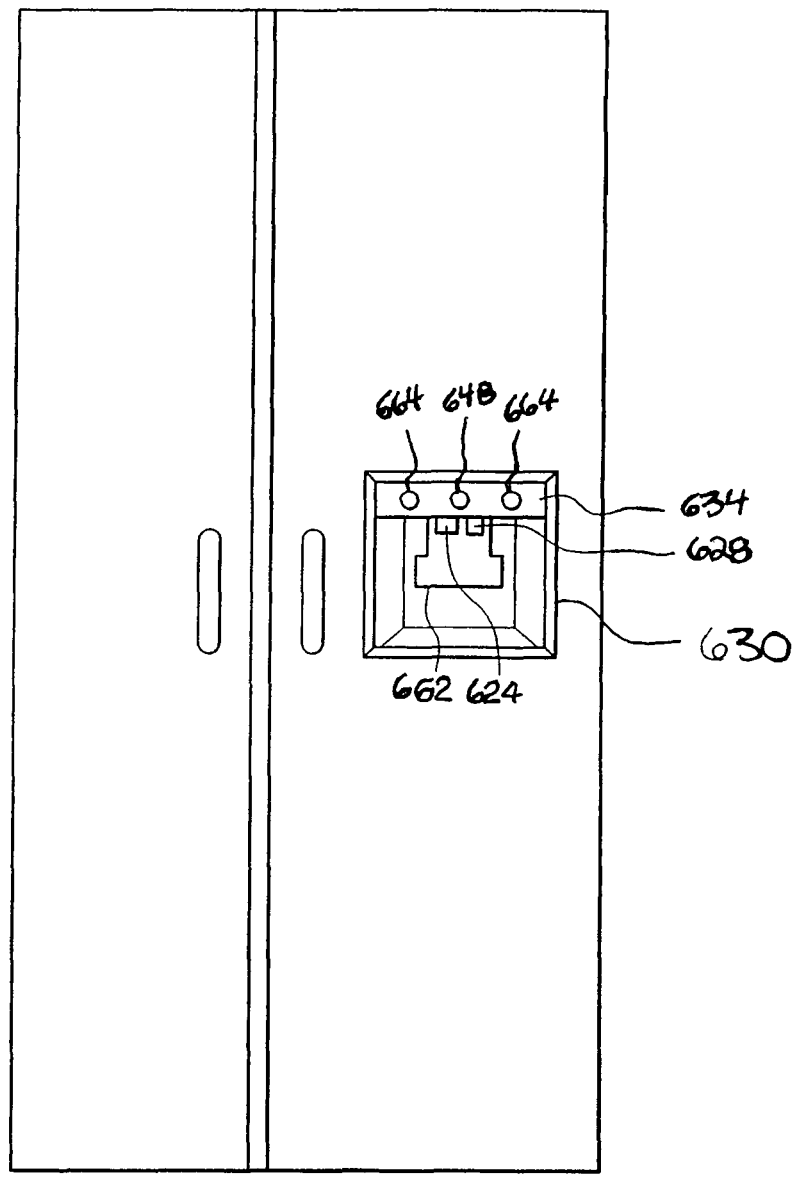
FIG. 24 is a schematic illustration of an exemplary additive dispensing system for a refrigerator according to an embodiment of the present invention.

In another embodiment of the present invention as illustrated in FIG. 24, the additive dispensing system of the present invention is incorporated into a water filtration system on a refrigerator 600. In one exemplary embodiment, the controller 634 is located on a refrigerator door 660 either on or adjacent to a dispensing cove 630 positioned on refrigerator door 660. The controller 634 may have one or more manual activators 648 to dispense an additive from the reservoir (not shown). The user may place a container in contact with the water flow switch 662 located in cove 630 to activate the flow of filtered water through the outlet 624 and into the container. In another exemplary embodiment, the controller 634 comprises one or more input selectors 664 to allow the user to select an amount and/or the type of additive, if any, to be dispensed with the filtered water. Alternatively, the filtered water may be dispensed into the container first, and then the container moved to the additive outlet (e.g., outlet check valve 158) to then manually dispense an amount of additive into the water in the container.

All documents cited in the detailed description of the invention are, in relevant part, incorporated herein by reference; a citation of any document is not to be construed as an admission that it is prior art with respect to the present invention. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An additive dispensing system for a refrigerator, comprising:
   a receptacle comprising a pump action device, said pump action device comprising a surface having an aperture disposed within said surface and an annular protrusion surrounding said aperture; and
   a disposable cartridge slidably mounted within the receptacle, said disposable cartridge comprising:
   a reservoir,
   a bladder disposed within said reservoir, said bladder containing an additive,
   an inlet check valve, and
   a diaphragm in cooperation with said inlet check valve to define a dose chamber in fluid communication with said bladder, said diaphragm comprising an additive outlet check valve in fluid communication with said dose chamber,
   wherein said additive outlet check valve includes a pair of sealing surfaces,
   wherein said disposable cartridge does not include any surfaces in its fluid path downstream of said pair of sealing surfaces;
   wherein said disposable cartridge slides within said receptacle such that said annular protrusion depresses said diaphragm and causes said additive outlet check valve to open and said dosing chamber to reduce in volume, forcing additive through said additive outlet check valve and dispensing additive from said additive dispensing system.

2. The additive dispensing system according to claim 1, wherein said disposable cartridge is connected to a refrigerator.

3. The additive dispensing system according claim 1, wherein said receptacle is connected to a fixture located adjacent to a refrigerator.

4. The additive dispensing system according to claim 1, wherein said receptacle is connected to a refrigerator.

5. The additive dispensing system according to claim 1, wherein said receptacle is removably connected to a refrigerator.

6. The additive dispensing system according to claim 1, wherein said receptacle is connected to a refrigerator such that said additive outlet check valve is substantially adjacent to an outlet of a water filtration system of the refrigerator.

7. The additive dispensing system according to claim 1, wherein said additive dispensing system comprises a means for removably connecting the disposable cartridge to a refrigerator.

8. The additive dispensing system according to claim 1, wherein said receptacle further comprises a space and a guide configured to receive and hold said disposable cartridge within said space such that said disposable cartridge may move within said receptacle.

9. The additive dispensing system according to claim 1, wherein said disposable cartridge is operable to selectively dispense the amount of additive from said bladder, through said inlet check valve and out of said additive outlet check valve through manual manipulation of said disposable cartridge causing said disposable cartridge to move within said receptacle.

10. The additive dispensing system according to claim 1, wherein said bladder, inlet check valve, diaphragm and additive outlet check valve define a fluid flow path that runs parallel along a longitudinal axis of said disposable cartridge.

11. The additive dispensing system according to claim 1, wherein said inlet valve is an umbrella valve, and said additive outlet check valve is a duckbill valve.

12. An additive dispensing system for a refrigerator, comprising:
 a receptacle, said receptacle comprising a pump action device, said pump action device comprising a surface having an annular protrusion surrounding an aperture; and
 a disposable cartridge provided within the receptacle, said disposable cartridge comprising:
  a reservoir,
  a bladder disposed within said reservoir, said bladder containing an additive, and
  an inlet check valve, and
  a diaphragm disposed over said inlet check valve to define a dose chamber in fluid communication with said bladder; wherein:
   said diaphragm comprises an additive outlet check valve in fluid communication with said dose chamber,
   said additive outlet check valve including a pair of sealing surfaces, said
   inlet check valve is an umbrella valve,
   said additive outlet check valve is a duckbill valve, and
   said disposable cartridge does not include any surfaces in its fluid path downstream of said pair of sealing surfaces; and
  wherein said disposable cartridge is disposed within said receptacle such that said disposable cartridge moves within said receptacle such that said annular protrusion depresses said diaphragm and causes said additive outlet check valve to open and said dosing chamber to reduce in volume, forcing additive through said additive outlet check valve.

13. An additive dispensing system for a refrigerator, comprising:
 a receptacle comprising a pump action device and a guide, wherein said pump action device comprising a surface having an annular protrusion surrounding an aperture, and wherein the guide receives and holds said disposable cartridge within a space such that said disposable cartridge may move within said receptacle; and
 a disposable cartridge movably mounted within the receptacle, said disposable cartridge comprising:
  a reservoir,
  a bladder disposed within said reservoir, said bladder containing an additive,
  an inlet check valve, and
  a diaphragm in cooperation with said inlet check valve to define a dose chamber in fluid communication with said bladder, said diaphragm comprising an additive outlet check valve in fluid communication with said dose chamber,
  wherein said additive outlet check valve includes a pair of sealing surfaces,
  wherein said disposable cartridge does not include any surfaces in its fluid path downstream of said pair of sealing surfaces;
 wherein said disposable cartridge moves along its longitudinal axis within said guide such that said annular protrusion depresses said diaphragm and causes said additive outlet check valve to open and said dosing chamber to reduce in volume, forcing additive through said additive outlet check valve and from said additive dispensing system.

14. The additive dispensing system according to claim 13, wherein said disposable cartridge slides within said receptacle.

* * * * *